United States Patent
Pao et al.

(10) Patent No.: US 12,516,655 B2
(45) Date of Patent: Jan. 6, 2026

(54) ROBUST MULTI-INPUT MULTI-OUTPUT CONTROL OF FLOATING OFFSHORE WIND TURBINES

(71) Applicant: The Regents of the University of Colorado, Denver, CO (US)

(72) Inventors: Lucy Pao, Boulder, CO (US); David Stockhouse, Broomfield, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 18/491,467

(22) Filed: Oct. 20, 2023

(65) Prior Publication Data

US 2024/0183334 A1 Jun. 6, 2024

Related U.S. Application Data

(60) Provisional application No. 63/417,900, filed on Oct. 20, 2022.

(51) Int. Cl.
  *F03D 7/02* (2006.01)
  *B63B 22/20* (2006.01)
  (Continued)

(52) U.S. Cl.
  CPC ......... *F03D 7/0202* (2023.08); *F03D 7/0224* (2013.01); *F03D 7/0272* (2013.01); *F03D 7/028* (2013.01); *F03D 13/256* (2023.08); *F03D 17/029* (2023.08); *B63B 22/20* (2013.01); *B63B 2035/446* (2013.01); *B63B 39/00* (2013.01); *F03D 13/25* (2016.05); *F03D 17/034* (2023.08); *F05B 2220/706* (2013.01); *F05B 2240/93* (2013.01); *F05B 2240/95* (2013.01);
  (Continued)

(58) Field of Classification Search
  CPC ...... F03D 7/0224; F03D 7/0272; F03D 7/028; F03D 7/044; F03D 13/25; Y02E 10/727; F05B 2240/93
  See application file for complete search history.

(56) References Cited

U.S. PATENT DOCUMENTS

| | | | |
|---|---|---|---|
| 8,022,566 B2 * | 9/2011 | Loh | F03D 7/0272 416/85 |
| 10,030,631 B2 * | 7/2018 | Couchman | F03D 9/25 |

(Continued)

FOREIGN PATENT DOCUMENTS

| JP | 6187935 B2 * | 8/2017 | ............. B63B 1/048 |
|---|---|---|---|
| WO | WO-2019042515 A1 * | 3/2019 | |
| WO | WO-2019049502 A1 * | 3/2019 | ............... F03D 1/06 |

OTHER PUBLICATIONS

English Translation of JP6187935B2 (Year: 2017).*
(Continued)

*Primary Examiner* — Courtney D Heinle
*Assistant Examiner* — Wesley Le Fisher
(74) *Attorney, Agent, or Firm* — Workman Nydegger

(57) ABSTRACT

A control system for a floating offshore wind turbine (FOWT). The FOWT includes a floating base, a tower, a nacelle, and rotor with blades that harvest energy from wind passing the FOWT. Without a rigid support, however, the FOWT is able to move. The controller uses generator speed and platform pitch position of the FOWT as inputs and manipulates blade pitch and torque resistance to achieve stability.

3 Claims, 12 Drawing Sheets

(51) Int. Cl.
*B63B 35/44* (2006.01)
*B63B 39/00* (2006.01)
*F03D 13/25* (2016.01)
*F03D 17/00* (2016.01)

(52) U.S. Cl.
CPC ..... *F05B 2270/32* (2013.01); *F05B 2270/705* (2013.01); *Y02E 10/727* (2013.01)

(56) References Cited

U.S. PATENT DOCUMENTS

| | | | |
|---|---|---|---|
| 10,087,913 B2 * | 10/2018 | Nielsen | F03D 13/25 |
| 11,125,211 B2 * | 9/2021 | Abbaszadeh | G05B 13/04 |
| 11,204,018 B2 * | 12/2021 | Nielsen | B63B 21/50 |
| 2018/0100487 A1 * | 4/2018 | Yamamoto | F03D 7/042 |
| 2020/0362819 A1 * | 11/2020 | Abbaszadeh | F03D 7/045 |
| 2024/0410333 A1 * | 12/2024 | Thomsen | F03D 13/256 |

OTHER PUBLICATIONS

David Stockhouse et al. "Control of a Floating Wind Turbine on a Novel Actuated Platform", Jun. 8-10, 2022, American Control Conference (ACC), (Year: 2022).*

English Translation of WO2019049502A1 (Year: 2019).*

Gabriela Benveniste et al. "D 7.4 State-of-the-Art FOWT design practice and guidelines", LIFES50+, p. 36-37 (Year: 2016).*

* cited by examiner

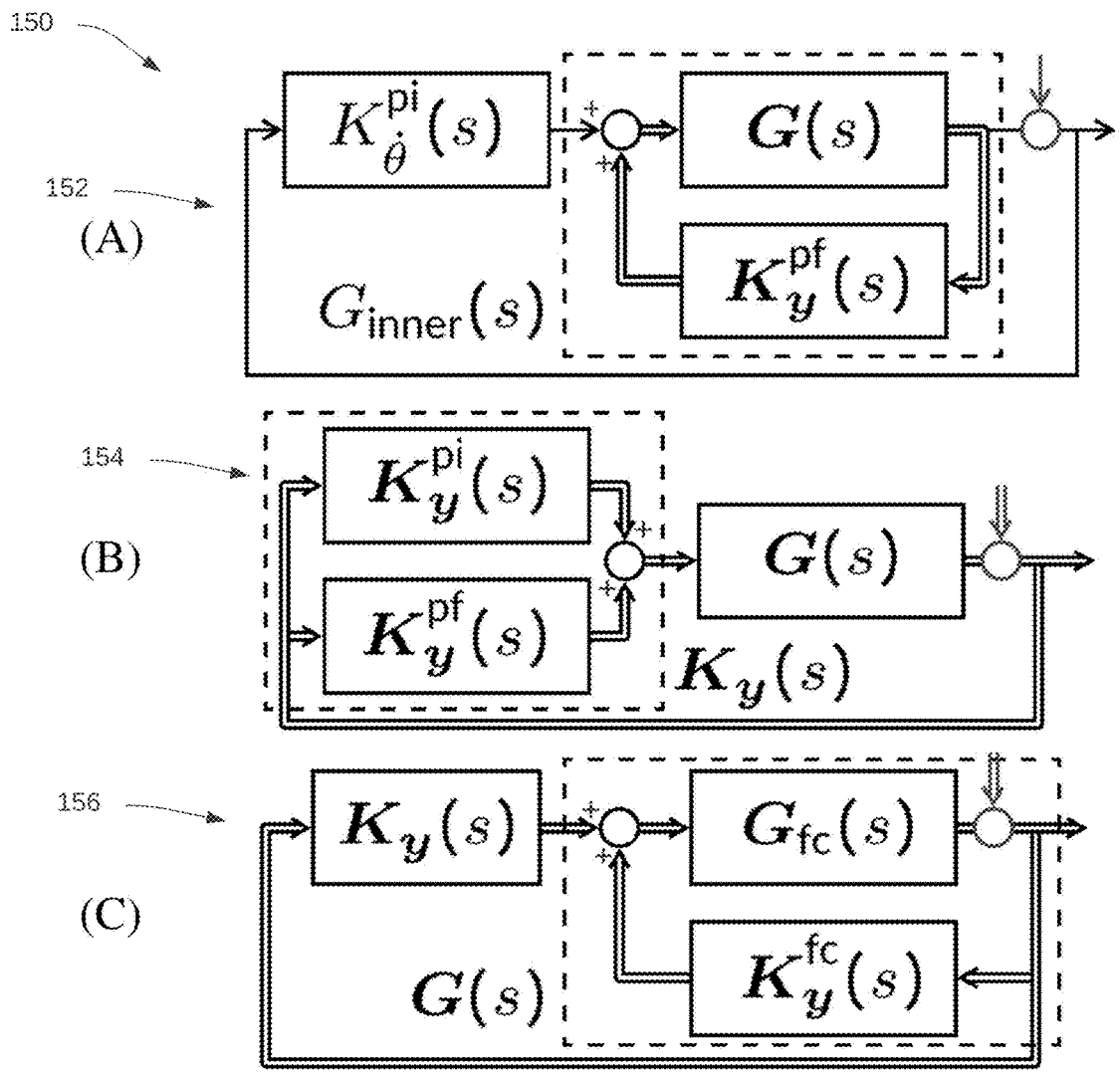

FIG. 7

| Controller Name | Description |
|---|---|
| Baseline ● | SISO PI controller with approximately constant parameters $\omega_{pi}$ = 0.3 rad/s and $\zeta_{pi}$ = 0.7. |
| Detuned ✶ | SISO PI controller with approximately constant parameters $\omega_{pi}$ = 0.2 rad/s and $\zeta_{pi}$ = 1.2. |
| SISO Robust ✕ | SISO PI controller with parameter schedules $(\omega_{pi}, \zeta_{pi})$ optimized over the SISO stability margin. |
| SR + Comp ▲ | SISO Robust (SR) augmented with PF control loops tuned to reduce the relative wind coupling term ($\alpha_{comp}$ large). |
| SR + Damp ▼ | SISO Robust (SR) augmented with PF control loops tuned to increase the platform damping ratio ($\zeta_{ptfm}$ large). |
| MIMO Robust ◆ | MIMO controller with parameter schedules $(\omega_{pi}, \zeta_{pi}, \alpha_{comp}, \zeta_{ptfm})$ jointly optimized over the MIMO FC stability margin. |

FIG. 8

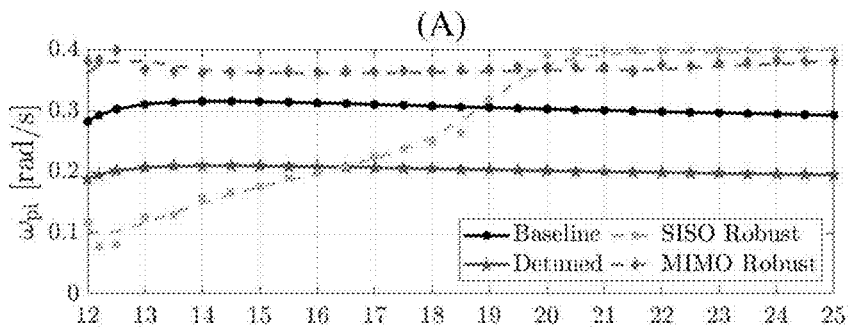
FIG. 9
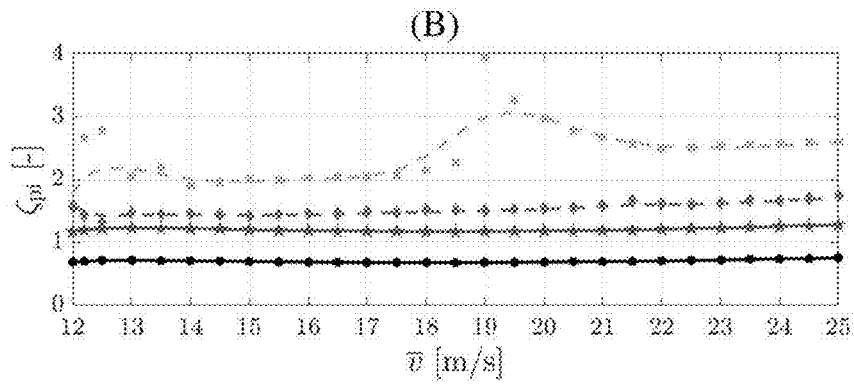
FIG. 10A
FIG. 10B

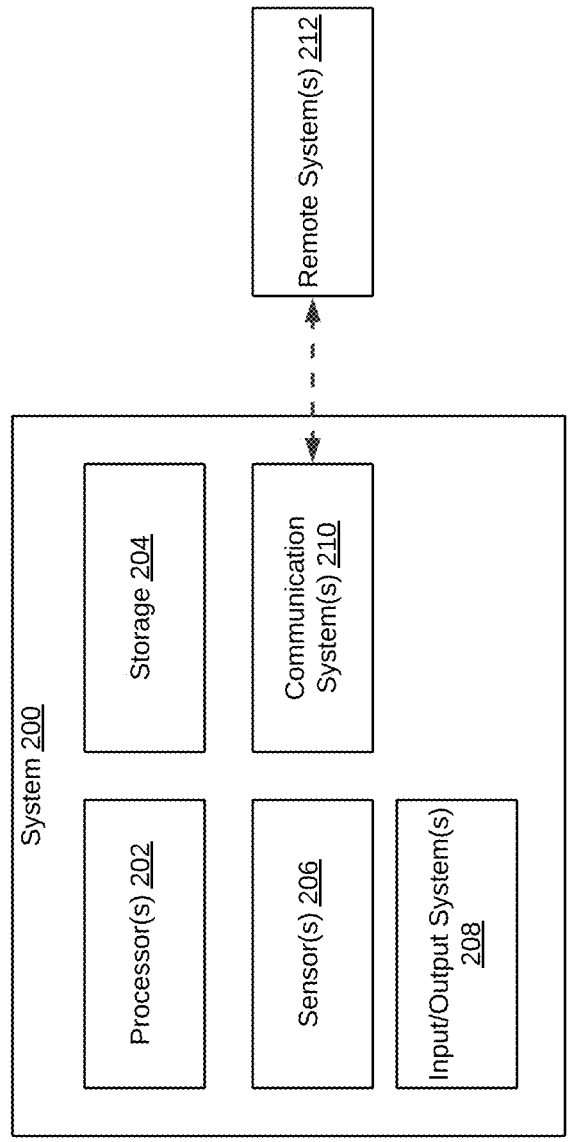

ROBUST MULTI-INPUT MULTI-OUTPUT CONTROL OF FLOATING OFFSHORE WIND TURBINES

CROSS-REFERENCE TO RELATED APPLICATIONS

This patent application claims priority to U.S. Provisional Patent Application No. 63/417,900 filed on Oct. 20, 2022, which is incorporated herein by reference in its entirety.

STATEMENT REGARDING FEDERALLY SPONSORED RESEARCH

This invention was made with government support under Grant No. DE-AR0001181 awarded by the U.S. Department of Energy. The government has certain rights to the invention.

BACKGROUND

Demand for renewable energy is growing. Wind energy is at the forefront of renewable energy sources. A continuing challenge for renewable energy is competing with other energy sources in terms of cost and reliability. A consideration for wind turbines that harvest energy from wind is the efficiency of operation. Another challenge is locating wind turbines in places that have sufficient wind. The recent development of floating offshore wind turbines (FOWTs) has provided exciting opportunities and challenges. One challenge facing the control of FOWTs is the problem of instability, or "negative damping," when using blade pitch feedback to control generator speed. This closed-loop instability can be attributed to non-minimum phase zeros in the transfer function from blade pitch to generator speed. Standard approaches to improving stability and performance include robust tuning of control gains and introducing multiple feedback loops to respond to platform motion. Combining these approaches is nontrivial because multiple control loops complicate the impact of coupling in the system dynamics. The single-loop approach to analyzing stability robustness neglects inter-loop coupling, while a simplistic multi-loop approach is highly sensitive to dimensional scaling and overestimates the robustness of the single-loop controller.

BRIEF SUMMARY

The present invention is directed to systems and methods for stabilizing a floating offshore wind turbine (FOWT). A controller may include measurement equipment for measuring wind speed relative to the FOWT and a pitch angle of a tower of the FOWT, a blade pitch actuator configured to adjust a blade pitch of blades of the FOWT, and a torque resistance actuator configured to adjust torque resistance of the FOWT. Additionally or alternatively, the controller may also estimate the wind speed and pitch angle of a tower or platform based on rotor speed measurements and a model of the wind turbine dynamics. The controller receives the wind speed and the pitch angle from the measurement equipment or estimator as control input and, based upon the control input, adjusts at least one of the blade pitch angle using the blade pitch actuator and the torque resistance using the torque resistance actuator to improve stability of the FOWT. The controller may execute a combined gain-scheduled proportional-integral (PI) control and platform feedback (PF) control, or a single-input, single output (SISO) proportional-integral control loop and a set of multi-input, multi-output control loops.

Further embodiments of the present disclosure are directed to a FOWT, including a base, a tower, and a nacelle coupled to the tower and housing wind turbine components. The FOWT also includes blades coupled to the wind turbine components within the nacelle, the blades protruding from the nacelle. The wind turbine components include an adjustable torque resistance component that adjusts a torque resistance of the wind turbine components. The FOWT also includes blade pitch actuators coupled to the blades that adjust a pitch of the blades, measurement equipment configured to measure wind speed relative to the FOWT or estimation equipment configured to estimate the wind speed relative to the FOWT, and a position monitor configured to measure or estimate a pitch angle of the FOWT defined as an angle relative to vertical and generally aligned with the tower. The FOWT also includes a controller configured to receive the wind speed and platform pitch angle of the FOWT as inputs, the controller being configured to calculate adjustments to at least one of the blade pitch using the blade pitch actuators, and a torque resistance using the torque resistance component.

Still further embodiments of the present disclosure are directed to a system for stabilizing a FOWT. The system may estimate a wind speed using convention methods or may include a wind speed sensor for sensing wind speed in an environment around the FOWT. Similarly, the system may estimate a position of the FOWT or include measurement equipment to measure a position sensor for sensing a position of the FOWT. The FOWT has a base that sits in a body of water, a tower extending vertically from the base, a nacelle, rotor, and blades coupled to the rotor such that wind moving past the blades causes the blades to rotate the rotor. The turbine generates power therefrom. The FOWT also includes blade pitch actuators that adjust a pitch of the blades. Increasing the pitch of the blades decreases wind capture and decreasing the pitch of the blades increases wind capture. The FOWT also includes a resistance torque actuator that adjusts resistance torque. Increasing resistance torque causes the turbine to generate more power and more resistance to the aerodynamic torque, and decreasing resistance torque causes the turbine to generate less power and less resistance to the aerodynamic torque. The FOWT also includes a controller configured to receive as inputs the wind speed and the position of the FOWT to adjust the pitch of the blades using the blade pitch actuator, and to adjust the resistance torque in response to the inputs.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings. Understanding that these drawings depict only typical implementations of the invention and are not therefore to be considered to be limiting of its scope, the invention will be described and explained with additional specificity and detail through the use of the accompanying drawings in which:

FIG. 7 shows block diagrams 150 representing various SISO and MIMO loop transfer functions according to embodiments of the present disclosure.

FIG. 8 is a table showing structured FOWT controllers according to the present disclosure.

FIG. 9 is a table showing a division of each controller into PI and PF components according to embodiments of the present disclosure.

FIG. 10A is an operating schedule of PI controller parameters according to embodiments of the present disclosure.

FIG. 10B is an operating schedule of PI controller parameters according to embodiments of the present disclosure.

FIG. 19 illustrates example components of a system 200 that may comprise or implement aspects of one or more disclosed embodiments.

DETAILED DESCRIPTION

Figure 1:
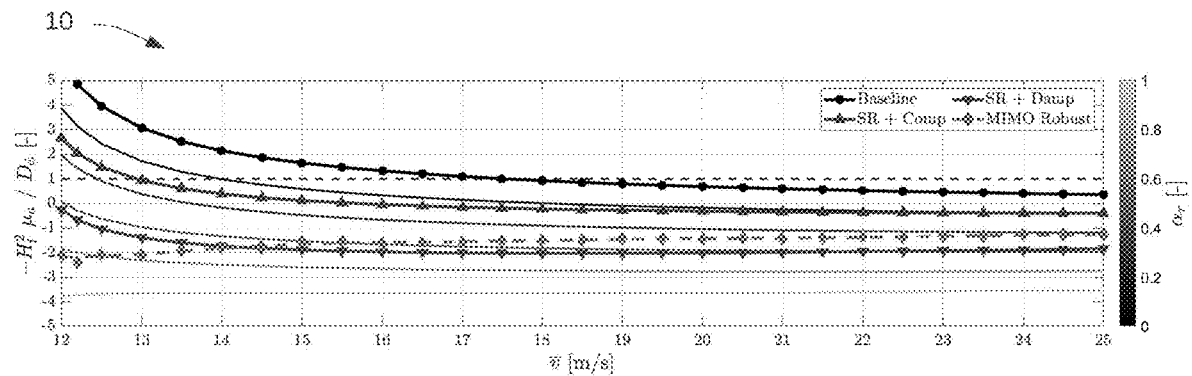
FIG. 1 is a chart of normalized control plots for different parameter values of $\alpha_r$, and for the MIMO controllers where wind speed is higher than a rated wind speed for the FOWT according to embodiments of the present disclosure.

The present disclosure is directed to floating offshore wind turbines (FOWTs) and specifically systems and methods for controlling FOWTs in the environment in which they are located. There are challenges to operating any floating structure, which are exacerbated by the nature of a FOWT that is designed and intended to experience high winds. The FOWTs are floating structures that are free to move with the waves and motion of the ocean in which they are located. There are many movements that are experienced by the FOWTs including the pitch of the FOWT, defined as the forward and back motion of the FOWT in a direction generally parallel with the flow of wind. Instability in FOWTs experiencing high winds and without being anchored to a solid structure poses a problem for the efficiency and, in extreme cases, failure of the FOWT.

The present disclosure is directed to a sensitivity representation that separates some of the natural FOWT dynamic coupling into a parallel feedback loop in the sensitivity function loop to address both of these concerns. The modified robustness measure is used with a simplified linear FOWT model to optimize scheduled multi-loop control parameters in an automated tuning procedure. This controller is implemented for the 10-MW Ultraflexible Smart FLoating Offshore Wind Turbine (USFLOWT) and compared against conventional single- and multi-loop controllers tuned using frequency-domain analysis and high-fidelity OpenFAST simulations. The multi-loop robust controller shows the highest overall performance in generator speed regulation and tower load reduction, though consideration of power quality, actuator usage, and other structural loading leads to additional trade-offs.

1. Nomenclature

The following abbreviations are used throughout this disclosure:
AEP: annual energy production;
DOF: degree of freedom;
DEL: damage equivalent load;
FC: feedback-coupled;
FOWT: floating offshore wind turbine;
HAWT: horizontal axis wind turbine;
IEC: International Electrotechnical Commission;
LCOE: levelized cost of energy;
LHP: left half-plane;
LQR: linear-quadratic regulator;
MIMO: multi-input, multi-output;
MPC: model predictive control;
NMPZ: non-minimum phase zero;
PID: proportional-integral-derivative;
PI: proportional-integral;
PF: platform feedback;
RHP: right half-plane;
RMS: root-mean-square;
ROSCO: the Reference Open-Source Controller;
SISO: single-input, single-output;
STD: standard deviation;
TSR: tip-speed ratio; and
USFLOWT: Ultraflexible Smart FLoating Offshore Wind Turbine.

2. Challenges

Floating offshore wind turbines (FOWTs) represent a significant step forward in the future growth and upscaling of utility-scale wind energy. In addition to modifications to the aerodynamic and structural design process from that of land-based wind turbines (and the need for hydrodynamic design), the control approaches for maximizing power and safety must adapt to be effective in a floating offshore environment, with the ultimate design objective being a reduction in levelized cost of energy (LCOE), the total cost per unit of energy produced. The additional degrees-of-freedom introduced by the floating platform present a particular challenge for the control system. For a horizontal axis wind turbine (HAWT), blade-pitch control at above-rated wind speeds affects the rotor thrust and induces platform fore-aft translational and rotational motion through the lever arm of the tower. Current trends in the deployment of HAWTs indicate that longer blades and taller towers are being utilized further exacerbating the effects of rotor thrust.

In addition to the expected increase in structural loading due to platform motion, the interplay between the aerodynamic torque and thrust sensitivities to blade pitch leads to non-minimum phase zeros (NMPZs). A FOWT system with NMPZs can become closed-loop unstable when employing a controller designed for a land-based HAWT. The presence of NMPZs can reduce a feedback system's margin of stability, restricting the allowable range of stabilizing feedback gains. For typical turbine designs, NMPZs are usually present at wind speeds just above $v_{rated}$ and disappear at higher wind speeds. While nonlinear analysis suggests that linearized closed-loop instability may not necessarily lead to catastrophic failure of the FOWT system, non-decaying oscillations induced by this instability can cause high structural loading and poor overall performance.

Wind turbines typically use gain-scheduled proportional-integral (PI) control to regulate generator speed at high winds. The simplest approach to avoiding instability without structurally modifying the conventional baseline controller is to detune the control gains. A common rule of thumb is to tune a controller such that the closed-loop response of the generator speed mode in isolation has a natural frequency below the platform's dominant fore-aft resonant frequency. This approach is convenient because the baseline PI controller is often tuned to target a particular natural frequency $\omega_{pi}$ and damping ratio $\zeta_{pi}$, as in the Reference Open-Source Controller (ROSCO) toolbox. Within this PI tuning framework, the simple detuning approach need only reduce $\omega_{pi}$ to be below the platform frequency $\omega_{ptfm}$. While easy to implement, this simple detuning may not be sufficient to restore stability at wind speeds close to $v_{rated}$ for platforms with low natural hydrodynamic damping. An additional drawback is that attempting to maintain the same detuned natural frequency at all wind speeds enforces detuning even at high wind speeds that do not suffer from this instability issue. Even within the lesser stable wind speeds at the low end of Region 3, the level of detuning necessary for stability differs for each operating point. Together, these aspects suggest that it is beneficial to design the controller with a distinct natural frequency at each operating point, but further analysis of the system dynamics is required to select an optimal schedule for $\omega_{pi}$ and $\zeta_{pi}$. The solution employed by some designs is to leverage a quantitative margin of stability for a low-order FOWT model to tune a gain schedule. The most common general stability margin is the inverse of the $\mathcal{H}_\infty$-norm of the sensitivity function.

Another promising FOWT control approach is the addition of feedback loops to compensate for the rotor-platform coupling that causes instability. Feeding back nacelle fore-aft velocity to the blade pitch and generator torque control inputs already used by the baseline controller allows benefits to performance without necessitating the cost of additional special-purpose actuators. Analyzing such multi-loop feedback requires a multi-input, multi-output (MIMO) transfer function representation of the FOWT dynamics because the rotor-platform coupling in the FOWT model is affected by the controller. Combining a robust PI gain schedule with multi-loop feedback results in good performance, but the standard approach of tuning each control loop in isolation can be improved by joint tuning that considers the coupled effects of MIMO feedback loops on one another in addition to their independent effects on the FOWT system.

The systems and methods of the present disclosure apply well to the Ultraflexible Smart FLoating OffshoreWind Turbine (USFLOWT) system, a research FOWT design. USFLOWT is composed of the DTU-10MW reference wind turbine atop the SpiderFLOAT platform, a highly flexible platform with relatively lower natural damping than many common platform substructures found in the literature. The low natural damping of the SpiderFLOAT platform, which assists in dissipating wave loads, makes USFLOWT a unique testing ground for controllers.

This disclosure presents a MIMO robustness analysis of the USFLOWT controller along with a set of controllers exploring the trade-offs between generator speed tracking, robust closed-loop stability, and design complexity. In Section 2, the FOWT control design problem is discussed, and a simplified control-oriented design model is introduced. In Section 3, common SISO and MIMO FOWT control approaches are described in the context of the design model and six scheduled controllers are tuned for USFLOWT using analytical and numerical methods. The stability robustness of each tuning approach is analyzed. In Section 4, the controllers are evaluated by simulating the closed-loop USFLOWT system using the nonlinear aero-servo-hydro-elastic tool OpenFAST that offers a higher level of fidelity than the simplified design model.

FIG. 1 is a chart 10 of normalized values of $-\mu_a(19)$ for different values of $\alpha_\tau$, and for the MIMO controllers, calculated at Region 3 operating points. Region 3 is defined as wind speeds above the rated wind speed. When $-H_t^2\mu_a/D_\phi<1$ (data points below the dashed line), then all zeros of $G_\beta^\beta$ are in the left half-plane (see (9)). The natural dynamics without compensation (9) has $\alpha_\tau=0$.

Region 2 is defined as wind speeds below the rated wind speed for the turbine. In Region 2, a control objective is to improve power generation. A standard generator torque control law $\tau=k\Omega^2$ is used in Region 2, while $\tau$ is nominally held constant to its rated value $\tau_{rated}$ by the baseline controller once $\Omega$ reaches its rated value, $\Omega_{rated}$.

At wind speeds above the rated wind speed (Region 3), the blades pitch to keep the aerodynamic torque $T_a$ equal in opposition to the resisting generator torque $\tau_{rated}$ and the generator speed equal to $\Omega_{rated}$. The fore-aft motion of the nacelle, dominated by the platform pitch degree of freedom (DOF) $\phi$, plays a significant role in FOWT behavior in Region 3 due to the coupling between platform pitch, generator speed, and blade pitch. Actuating the blade pitch $\beta$ to regulate generator speed $\Omega$ also impacts the rotor thrust $F_a$ and disturbs the platform pitch $\phi$. The platform motion in turn causes a disturbance on the generator speed that must be corrected by blade pitch feedback, driving additional platform pitch activity. This coupling may cause closed-loop instability if not taken into account by the design process.

One objective of the Region 3 controller in this disclosure is to track a generator speed reference, which is taken as the constant rated value $\Omega_{rated}$. Some controllers use a variable reference to achieve power or stability goals. The maximum allowable generator overspeed is constrained to $\Omega\leq1.2\cdot\Omega_{rated}$ in this disclosure for the safety of the turbine. Underspeed errors are not critical failures but represent a loss of annual energy production (AEP) and thus should be avoided for LCOE performance. The standard deviation (STD) is used to quantify regulation performance for both overspeed and underspeed, and the absolute maximum overspeed must be kept below the constraint. While the variation of generator power is often a consideration of Region 3 wind turbine performance, power quality is not included as an objective of the control design approach in this disclosure. Other MIMO feedback architectures have been designed to reduce power variations, and regulation of both generator speed and power may be improved by combining multiple MIMO control approaches.

Figure 2:
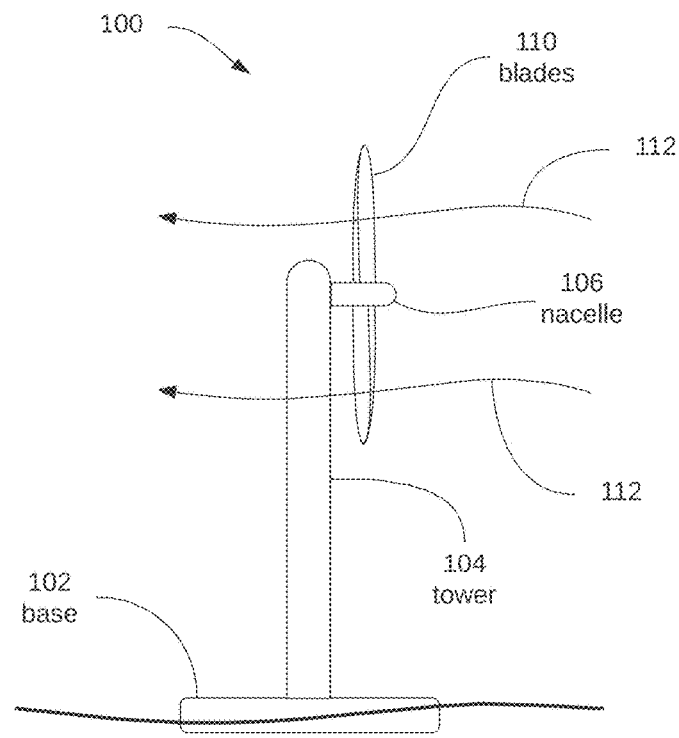
FIG. 2 is a schematic illustration of a FOWT according to embodiments of the present disclosure.

FIG. 2 is a schematic illustration of a FOWT 100 according to embodiments of the present disclosure. The FOWT 100 includes a base 102 that rests in the water and enables the FOWT 100 to float. However, the FOWT 100 is able to move in the water with some range of freedom because it is moored with slack or semi-taught lines (not shown) to the seafloor. The FOWT 100 also includes a tower 104 extending vertically above the base 102 to reach winds above the surface of the water for more efficient energy harvesting. The height of the tower 104 can vary. The systems and methods described herein are applicable to FOWTs of any height, including FOWTs FOWTs such as the Ultraflexible Smart Floating Offshore Wind Turbine (USFLOWT), and those which use the SpiderFLOAT platform.

At an elevated position on the tower 104 is a nacelle 106 that holds a rotor and other equipment for harvesting energy from the passing wind 112. The nacelle 106 is typically mounted on top of the tower 104. The FOWT 100 also includes blades 110 which protrude from the nacelle 106 and are coupled to the turbine such that passing wind rotates the blades 110 which in turn rotate the rotor to generate useful energy. The blades 110 can be adjustable in terms of pitch by blade pitch actuators (not shown). Changing the pitch of the blades 110 causes the wind to exert more or less torque on the rotor due to the passing wind 112.

Figure 3:
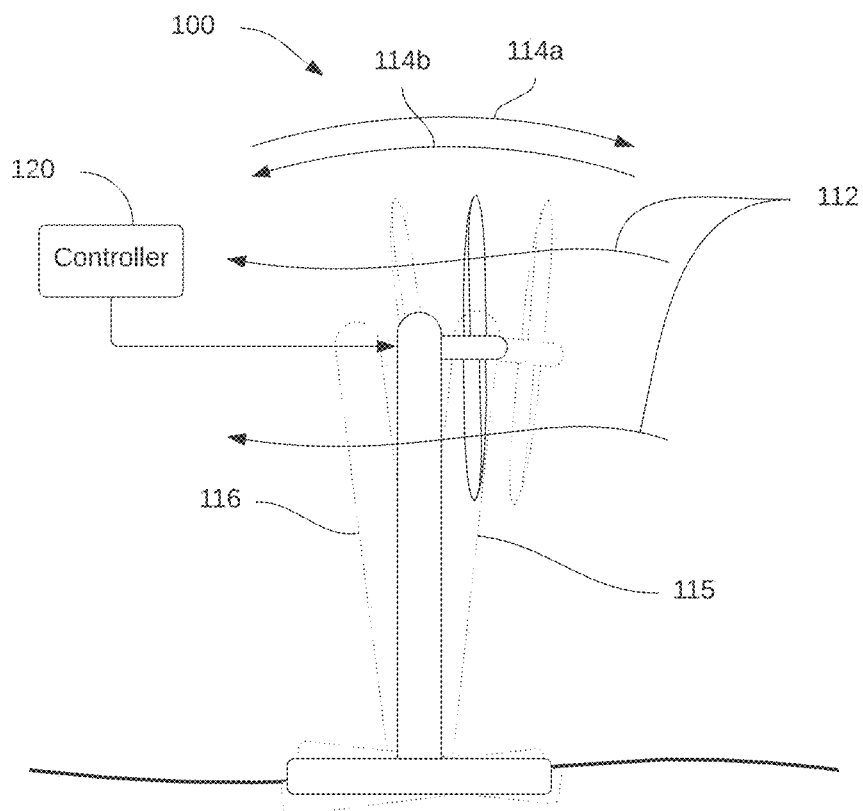
FIG. 3 is a schematic illustration of the FOWT of FIG. 2 showing movements and the effects of movement on the FOWT according to embodiments of the present disclosure.

FIG. 3 is a schematic illustration of the FOWT 100 of FIG. 2 showing movements and the effects of movement on the FOWT 100 according to embodiments of the present disclosure. The FOWT 100 pitches back and forth naturally due to forces of the passing wind 112 and due to the degree of freedom of a floating platform. The FOWT 100 experiences higher effective wind speed as it pitches forward with arrow 114a, and experiences lower effective wind speed as it pitches backward with arrow 114b. These movements can present a challenge to the FOWT 100 in terms of fatigue failure as well as a dynamic fracture.

The natural movement of the FOWT 100 in the water is a sinusoidal, periodic oscillation between a forward-most point 115 and a rearward-most point 116. As the FOWT 100 moves between these points the wind speed it experiences changes as a function of the sinusoidal movement.

The FOWT 100 includes a controller 120 that performs calculations based on inputs, and controls parameters of the FOWT 100 in response that mitigate the movements and forces experienced by the FOWT 100. In some embodiments the control inputs are the wind speed and the position of the FOWT 100, particularly with respect to the pitch angle of the tower of the FOWT 100. Outputs can be adjustments to the blade pitch and the torque resistance in the turbine. In some embodiments these outputs are altered to generally match the sinusoidal oscillations of the FOWT 100 itself.

Figure 4:
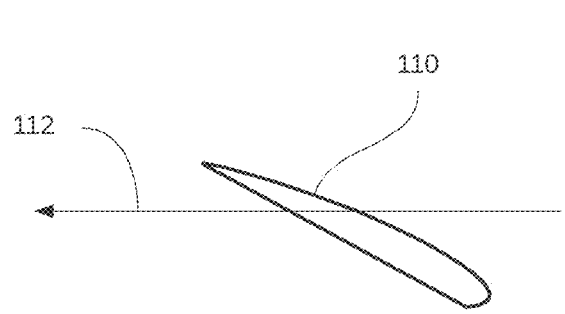
FIG. 4 illustrates a blade of the FOWT in a passing wind according to embodiments of the present disclosure.
Figure 5:
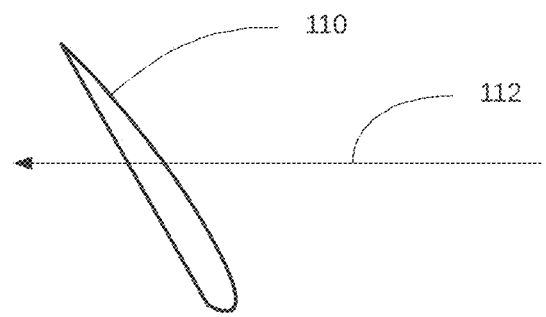
FIG. 5 illustrates the same blade of the FOWT in the passing wind at a lower pitch according to embodiments of the present disclosure.

FIG. 4 illustrates a blade 110 of the FOWT in a passing wind 112. The blade 110 is at a relatively high pitch, and wind capture is relatively low. FIG. 5 illustrates the same blade 110 of the FOWT in the passing wind 112 at a lower pitch. There is more wind capture at this lower pitch angle.

Figure 6:
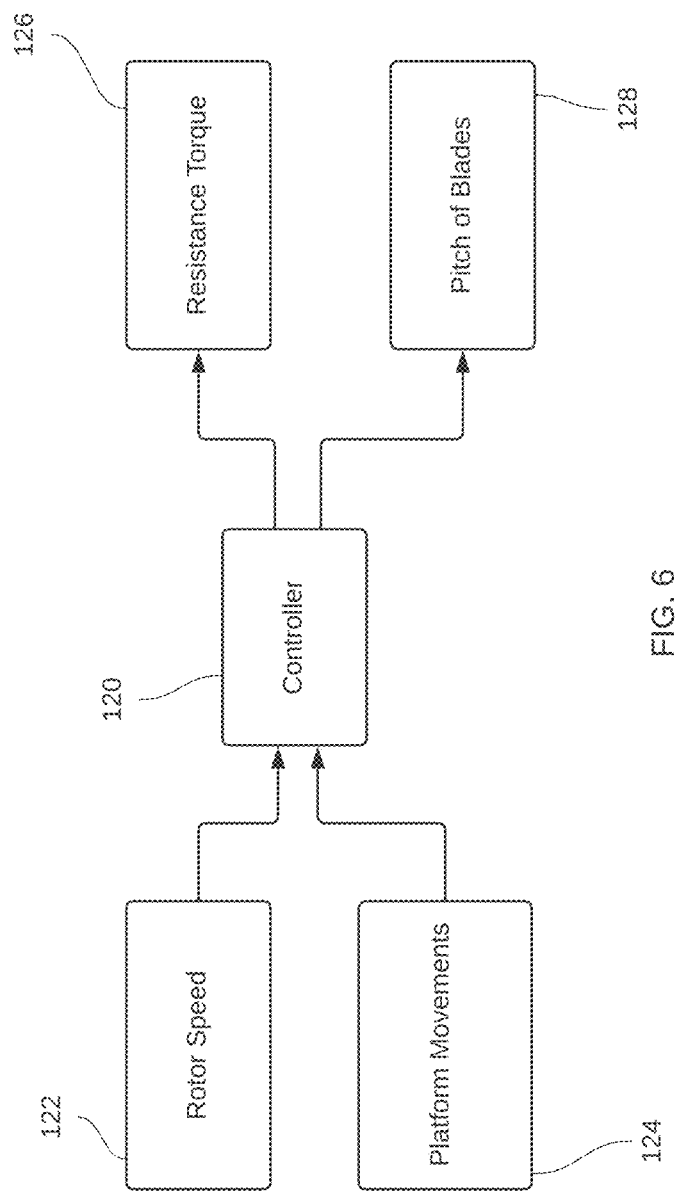
FIG. 6 is a schematic block diagram of a controller for stabilizing a FOWT according to embodiments of the present disclosure.

FIG. 6 is a schematic block diagram of a controller 120 for stabilizing a FOWT according to embodiments of the present disclosure. The controller 120 can be onboard the FOWT, or it can be remote. The FOWT may also include sensors such as wind gauges and position sensors for monitoring the speed of the passing wind and the position and velocity of the FOWT. In some embodiments the wind speed is estimated using various direct or indirect measurements.

Inputs for the controller 120 include the speed of wind 122 as measured by suitable sensory equipment that measures the wind or estimated wind speeds. The speed of wind may include a relative speed of the wind, as well as an independent measurement that does not change with the pitching of the FOWT. Another input to the controller 120 can be the movement of the FOWT which can be expressed in terms of position, velocity, and/or periodicity of the pitching movement of the FOWT as it rocks back and forth in the water. The movement of the FOWT can be measured and/or estimated using conventional methods.

The controller 120 makes calculations on the basis of these inputs and outputs control signals in terms of resistance torque at 126. The resistance torque 126 can be increased or decreased by making adjustments to generator parameters and/or rotor parameters. Another output can be the pitch of the blades at 128. The lower the pitch of the blades, the greater the torque caused by the passing wind. By controlling these outputs the stability of the FOWT is improved.

The mechanical components of the system are subject to structural loading, both as fatigue due to cyclic loading and ultimate limits from extreme loading events. Fatigue loads are estimated by computing the damage equivalent load (DEL) resulting from loading cycles, and extreme loads are calculated from the maximum absolute load experienced over all simulation cases. The FOWT components considered for loading analysis in this disclosure are the rotor-shaft torsion, tower-base bending moment, tower-top bending moment, and blade flapwise bending moment. A secondary objective for the controller is keeping these structural loads low. The control design model includes states representing generator speed $\Omega$ and platform pitch $\phi$, so the model-based control design can directly target rejecting disturbances affecting these signals using feedback to the modeled actuators, blade pitch $\beta$ and generator torque $\tau$. Unmodeled outputs (such as structural loads) are indirectly addressed in the design process by limiting feedback gains and reducing platform motion. Gain limits in the design process also indirectly reduce actuator usage.

2.1 FOWT Model.

For the purposes of control design in this disclosure, most higher order nonlinear effects are ignored in favor of a simplified model that lends itself to design through intuition. The generator speed $\Omega$ is represented by $\dot{\theta}$, where the generator azimuth $\theta=\int \Omega dt$ is used for integral feedback control. A first-order model of a wind turbine describes the dynamics of the generator speed, $\dot{\theta}$, with respect to the aerodynamic torque $T_a$ and the generator resistance torque $\tau$:

$$\ddot{\theta} = \frac{N_g}{J_r}\left(T_a(\dot{\theta}, v, \beta) - N_g\tau\right), \quad (1)$$

where $\beta$ is the blade pitch angle, $v$ is the rotor-averaged wind speed, $N_g$ is the gearbox ratio, and $J_r$ is the rotor-drivetrain inertia. The aerodynamic torque is a nonlinear function of rotor variables ($\dot{\theta}$, $v$, and $\beta$) described numerically by the power coefficient $C_p$ calculated by a rotor aerodynamic solver (the sometimes-used torque coefficient $C_q$ is related to the power coefficient by $C_q = C_p/\lambda$, where $\lambda$ is the TSR). Dynamic induced-flow effects are neglected by this first-order model; the wake is quasi-static. We can numerically compute a linearized model describing the system response to small perturbations in the state and input variables at each operating point. The linearized form of (1) is $$\ddot{\tilde{\theta}} = \frac{N_g}{J_r}\left(\frac{\partial T_a}{\partial \omega}\dot{\tilde{\theta}} + \frac{\partial T_a}{\partial v}\tilde{v} + \frac{\partial T_a}{\partial \beta}\tilde{\beta}\right) - \frac{N_g^2}{J_r}\tilde{\tau}, \quad (2)$$

where $\tilde{x}$ indicates a perturbation from steady-state equilibrium point $\bar{x}$ and each partial derivative $$\frac{\partial T_a}{\partial x}$$

is evaluated at ($\bar{\dot{\theta}}$, $\bar{v}$, $\bar{\beta}$). These first-order sensitivities are estimated numerically from the $C_p$-function at each operating point, assuming equilibrium wake. Higher order aerodynamic solvers may be used to compute dynamic sensitivities more accurately, but in this disclosure, approximate sensitivity values are combatted by robust tuning.

Tuning FOWT-specific control features requires a model that incorporates some floating platform dynamics. In this disclosure, the platform is represented by a single DOF: platform pitch. The dynamic response of the platform pitch $\phi$ is approximated as a second-order oscillator aggregating the damping and restoring forces caused by gravity, hydrodynamics, and mooring elasticity, while the other platform DOFs are ignored. The pitch direction is defined such that $\phi > 0$ means that the platform is tilting downwind ("backwards" from the rotor-facing direction), and during operation $\phi$ is assumed small enough that the small-angle approximation holds. The simplified second-order platform dynamics are:

$$J_\phi\ddot{\phi} + D_\phi\dot{\phi} + K_\phi\phi = H_t F_a(\dot{\theta}, v, \beta), \quad (3)$$

where $J_\phi$ is the moment of inertia of the FOWT about the pitch rotational axis, $H_t$ is the distance from the rotor hub to the platform pitch rotational axis (approximately tower length), $D_\phi$ is the hydrodynamic damping, and $K_\phi$ is the spring-like stiffness. Both $D_\phi$ and $K_\phi$ are assumed constant linear and are identified using platform-displacement decay tests of a nonlinear USFLOWT model in OpenFAST. $F_a$ is the aerodynamic thrust at the rotor, a nonlinear function of the rotor variables computed similarly to $T_a$. Platform pitch motion $\dot{\phi}$ induces a relative wind speed at the rotor in addition to the inflow wind disturbance $v_d$. The effective wind speed seen by the rotor is:

$$v = v_d - H_t\dot{\phi}. \quad (4)$$

When platform motion is considered, this relative wind speed (4) is applied to the aerodynamic torque $T_a$ in (1) and (2) and the aerodynamic thrust $F_a$ in (3).

The simplified model in (3) ignores many higher order dynamics of the USFLOWT system, including additional platform DOFs (such as surge and heave translations), nonlinear mooring dynamics, and the complex flexibility and hydrodynamic response of the SpiderFLOAT platform. However, this low-order model is sufficiently detailed for the tuning process presented here, as long as the platform does not experience extreme displacement (>5°) during operation. Similar to (2), the platform dynamics (3) can be linearized at a given operating point and coupled with (4) to form:

$$J_\phi\ddot{\tilde{\phi}} + \left(D_\phi + H_t^2\frac{\partial F_a}{\partial v}\right)\dot{\tilde{\phi}} + K_\phi\tilde{\phi} = H_t\left(\frac{\partial F_a}{\partial \Omega}\dot{\tilde{\theta}} + \frac{\partial F_a}{\partial v}\tilde{v}_d + \frac{\partial F_a}{\partial \beta}\tilde{\beta}\right). \quad (5)$$

Combining linearized models for generator speed (2) and platform pitch (5) yields a state-space model with state vector $x = [\tilde{\theta}\,\dot{\tilde{\theta}}\,\tilde{\phi}\,\dot{\tilde{\phi}}]^T$ and input vector $u = [\tilde{v}_d\,\tilde{\beta}\,\tilde{\tau}]^T$, where bold typeface indicates a multi-dimensional vector or matrix quantity. The state-space model is $\dot{x} = Ax + Bu$:

$$\begin{bmatrix}\dot{\tilde{\theta}}\\\ddot{\tilde{\theta}}\\\dot{\tilde{\phi}}\\\ddot{\tilde{\phi}}\end{bmatrix} = \begin{bmatrix}0 & 1 & 0 & 0\\ 0 & \frac{N_g}{J_r}\frac{\partial T_a}{\partial \Omega} & 0 & \frac{-N_g}{J_r}H_t\frac{\partial T_a}{\partial v}\\ 0 & 0 & 0 & 1\\ 0 & \frac{H_t}{J_\phi}\frac{\partial F_a}{\partial \Omega} & \frac{-K_\phi}{J_\phi} & \frac{-1}{J_\phi}\left(D_\phi + H_t^2\frac{\partial F_a}{\partial v}\right)\end{bmatrix} \quad (6)$$

-continued $$\begin{bmatrix} \dot{\theta} \\ \ddot{\tilde{\theta}} \\ \dot{\tilde{\phi}} \\ \ddot{\tilde{\phi}} \end{bmatrix} + \begin{bmatrix} 0 & 0 & 0 \\ \frac{N_g}{J_r}\frac{\partial T_a}{\partial v} & \frac{N_g}{J_r}\frac{\partial T_a}{\partial \beta} & -\frac{N_g^2}{J_r} \\ 0 & 0 & 0 \\ \frac{H_t}{J_\phi}\frac{\partial F_a}{\partial v} & \frac{H_t}{J_\phi}\frac{\partial F_a}{\partial \beta} & 0 \end{bmatrix} \begin{bmatrix} \tilde{v}_d \\ \tilde{\beta} \\ \tilde{\tau} \end{bmatrix}$$

The blocks on the diagonal represent uncoupled second-order dynamics of the generator and platform modes from (2) and (5), and the off-diagonal blocks represent dynamic coupling between modes. In particular, the nonzero entry in the upper-right block of A is the coupling due to rotor-relative wind speed (4) that amplifies platform motion as a disturbance on the generator speed. Reducing this term is a goal of the MIMO control design in Section 3.

The system outputs y=Cx+Du can be selected based on available measurements from the FOWT system and required observability for feedback control design. For this disclosure it is assumed that $\tilde{\theta}$ and $\tilde{\phi}$ are directly measured states and therefore clearly observable, and $\tilde{\theta}$ is constructed by integrating $\tilde{\dot{\theta}}$. The output matrices for this control design are:

$$C = \begin{bmatrix} 0 & 1 & 0 & 0 \\ 0 & 0 & 0 & 1 \end{bmatrix}; D = 0 \quad (7)$$

The output signals y are filtered as part of each feedback loop to remove noise and over-actuation at undesirable frequencies. This filtering is ignored for the model analysis in this disclosure but is included for all stability margin calculations.

2.1.1 Transfer Function.

The transfer function representation of this system is:

$$G(s) = C(sI - A)^{-1} B = \begin{bmatrix} G_v^{\dot{\theta}}(s) & G_\beta^{\dot{\theta}}(s) & G_\tau^{\dot{\theta}}(s) \\ G_v^{\phi}(s) & G_\beta^{\phi}(s) & G_\tau^{\phi}(s) \end{bmatrix}, \quad (8)$$

where each element $G_u^y(s)$ is a single-input, single-output (SISO) transfer function from input ũ (column index) to output ỹ (row index). A basic turbine controller feeds back generator speed error $\tilde{\dot{\theta}}$ to blade pitch $\tilde{\beta}$, (see Section 3.1.1) effectively operating on the SISO transfer function $G_\beta^{\dot{\theta}}(s)$. In this disclosure, the state-space model is used to gain analytical insight to the FOWT dynamics, while the transfer function is used for sensitivity analysis in the frequency domain.

2.1.2 Non-Minimum Phase Zeros.

The SISO transfer function $G_\beta^{\dot{\theta}}(s)$ suffers from the presence of NMPZ when:

$$-H_t^2 \mu_a > D_\phi, \quad (9)$$

where $\mu_a = \frac{\partial F_a}{\partial a} - \frac{\partial T_a}{\partial t}\frac{\partial F_1/\partial \beta}{\partial T_a/\partial \beta}$.

Within the operating regions of the wind turbine, $T_a$ and $F_a$ are both strictly increasing with respect to v and strictly decreasing with respect to β, so $\frac{\partial T_a}{\partial v}, \frac{\partial F_a}{\partial v} > 0$ and $\frac{\partial T_a}{\partial \beta}, \frac{\partial F_a}{\partial \beta} < 0$.

The normalized left-hand side of inequality (9) computed for the open-loop USFLOWT model (6) is visualized by the black curve (Baseline) in FIG. 1. MIMO feedback is capable of relocating these NMPZs and even bringing them into the left half-plane (LHP).

The blade-pitch regulator feedback loop causes the closed-loop poles to approach the open-loop zeros. NMPZs pull the poles towards the right half-plane (RHP) in the s-plane. Considering each complex-conjugate pair of poles as a second-order damped oscillator mode, this feedback reduces the damping ratio ζ, until eventually the poles cross into the RHP and become unstable. This instability implies ζ<0 so is referred to as the "negative damping" problem. When NMPZs are present, even relatively modest feedback gains can lead to closed-loop linearized instability. Instability for a FOWT system causes the generator speed and platform pitch to undergo oscillations with non-decaying amplitude, even without disturbances. Nonlinearities save the FOWT system from unbounded divergence, but a stable linearized control system typically has better performance than one that does not maintain stability.

3. Control Design

The structure of the controller used in this disclosure is adapted from well-tested FOWT controllers in the literature. The controller is built from individual control loops rather than a full-state feedback approach. State feedback has been explored using methods such as linear-quadratic regulator (LQR) and $\mathcal{H}_\infty$ control, but individual loop construction is preferred in this disclosure to leverage intuition about a more easily conceptualized design space and to satisfy industry preferences towards simplicity. The controller structure is introduced above and then tuned in a variety of SISO and MIMO configurations to contrast different approaches for designing FOWT controllers to improve closed-loop stability. The control tuning parameters may be jointly optimized and scheduled across all of Region 3.

3.1 Controller Formulation.

The FOWT controller consists of two feedback components: a SISO PI control loop regulating generator speed (described in Section 3.1.1) and a set of MIMO auxiliary loops referred to as platform feedback (PF) (described in Section 3.1.2). The PI and PF control loops are closed around the simplified FOWT model (6) in Section 3.1.3. For added context, the closed-loop system matrix (22) is referenced prior to its introduction.

3.1.1 Turbine Controller.

The fundamental component of the FOWT controller is a turbine control loop feeding back generator speed error to blade pitch, most often using a PI controller. The turbine PI controller equation is:

$$\tilde{\beta}_{pi} = -k_p \tilde{\dot{\theta}} - k_i \tilde{\theta}, \quad (10)$$

and the torque control actuator is left constant: $\tilde{\tau}_{pi}=0$. In implementation, the azimuth term $\tilde{\theta}$ is computed as the integral $\int \tilde{\dot{\theta}} dt$ rather than employing feedback of a second measured state. The azimuth state is included in the model (6) to facilitate a simple closed-loop description in (22).

For simplicity, some common wind turbine control features are left out of consideration in this disclosure entirely, including constant-power torque control and peak thrust shaving, but these could be combined with the control architecture considered in this disclosure without significant modifications.

The PI controller is represented as a SISO transfer function from generator speed $\tilde{\dot{\theta}}$ to blade pitch $\tilde{\beta}$ by $$K_{\dot{\theta}}^{pi} = (s) = k_p + \frac{k_i}{s}.$$

This controller transfer function is embedded into a sparse 3×2 MIMO transfer function matrix $K_y^{pi}(s)$ for MIMO controller design. The PI controller (10) is embedded in a sparse full-state 3×4 feedback gain matrix $K_x^{pi}$ to match the state-input dimension of the model (6) as $$K_y^{pi}(s) = \begin{bmatrix} 0 & 0 \\ k_p + \frac{k_i}{s} & 0 \\ 0 & 0 \end{bmatrix}; K_x^{pi} = \begin{bmatrix} 0 & 0 & 0 & 0 \\ k_i & k_p & 0 & 0 \\ 0 & 0 & 0 & 0 \end{bmatrix}. \quad (11)$$

where the PI controller (10) is formulated in the Laplace and time domains as $u(s)=-K_y^{pi}(s)y(s)$ and equivalently $u=-K_x^{pi}x$. The PI controller appears in the upper-left block of the closed-loop system matrix (22). The PI gains $k_p$ and $k_i$ are parameterized using the decoupled SISO generator model in (2). Blade-pitch PI feedback results in a second-order closed-loop system with natural frequency $\omega_{pi}$ and damping ratio $\zeta_{pi}$:

$$\tilde{\ddot{\theta}} + \frac{N_g}{J_r}\left(k_p\frac{\partial T_a}{\partial \beta} - \frac{\partial T_a}{\partial \Omega}\right)\tilde{\dot{\theta}} + k_i\frac{N_g}{J_r}\frac{\partial T_a}{\partial \beta}\tilde{\theta} = \tilde{\ddot{\theta}} + 2\zeta_{pi}\omega_{pi}\tilde{\dot{\theta}} + \omega_{pi}^2\tilde{\theta}, \quad (12)$$

which is represented in state-space form in the upper-left block of (22). Gains can be selected to satisfy a desired $\omega_{pi}$ and $\zeta_{pi}$ as follows:

$$k_p = \frac{\frac{N_g\partial T_a}{J_r\partial\omega} + 2\zeta_{pi}\omega_{pi}}{\frac{N_g\partial T_a}{J_r\partial\beta}}, \quad k_i = \frac{\omega_{pi}^2}{\frac{N_g\partial T_a}{J_r\partial\beta}} \quad (13)$$

where the aerodynamic sensitivities $$\left(\frac{\partial T_a}{\partial x}\right)$$

are evaluated at $\tilde{\dot{\theta}} = \Omega_{rated}$, $\bar{v}$, and $\bar{\beta}$ for each Region 3 operating point. In order to satisfy the desired response at all operating points in a single controller, the gains are scheduled by $\bar{v}$ or $\bar{\beta}$ (which are both monotonic in Region 3) and interpolated based on the current operating point at each time step.

There is a one-to-one relationship between desired $\omega_{pi}$ and $\zeta_{pi}$ (the tuning parameters) and PI gains $k_p$ and $k_i$ (the "raw" gains). By parameterizing the controller with ($\omega_{pi}$, $\zeta_{pi}$), the tuning process is more intuitive to the control designer[6] and well-conditioned for an optimization algorithm. Gain parameters designed for a floating system, without accounting for platform dynamics, may make the FOWT system unstable near rated. Restoring stability to the closed-loop SISO system can be accomplished by detuning $\omega_{pi}$ or by optimizing the parameters over a stability margin. Both methods are employed to schedule the PI controller gains.

3.1.2 Platform Feedback.

Introducing feedback from platform pitch rate $\tilde{\dot{\phi}}$ to the turbine control actuators $\tilde{\beta}$ and $\tilde{\tau}$ can further influence the FOWT dynamics beyond the generator-speed control loop accessible to a SISO controller. These MIMO control loops are called platform feedback (PF) in this disclosure, but they have been referred to as floating feedback, nacelle feedback, and tower-top feedback in other works. For simplicity, each loop has only a proportional gain multiplying $\tilde{\dot{\phi}}$, leading to PF signals for blade pitch (14a) and generator torque (14b):

$$\tilde{\beta}_{pf} = -k_\beta\tilde{\dot{\phi}} \quad (14a)$$

$$\tilde{\tau}_{pf} = -k_\tau\tilde{\dot{\phi}}. \quad (14b)$$

The PF signals for each actuator add to the PI control signals to make the combined MIMO controller: $\tilde{\beta} = \tilde{\beta}_{pi} + \tilde{\beta}_{pf}$ and $\tilde{\tau} = \tilde{\tau}_{pi} + \tilde{\tau}_{pf}$. Similarly, the PF controller is formulated as a transfer function and full-state feedback gain matrix as $$K_y^{pf}(s) = \begin{bmatrix} 0 & 0 \\ 0 & k_\beta \\ 0 & k_\tau \end{bmatrix}; K_z^{pf} = \begin{bmatrix} 0 & 0 & 0 & 0 \\ 0 & 0 & 0 & k_\beta \\ 0 & 0 & 0 & k_\tau \end{bmatrix} \quad (15)$$

Note that the PI (11) and PF (15) gain matrices are each sparse, whereas a fullstate feedback approach would potentially employ twice as many gains in the bottom two rows of the state-feedback gain $K_x$ but with far less decipherable understanding of the contributions of each feedback loop. The gains $k_\beta$ and $k_\tau$ are parameterized according to two effects that platform feedback has on the system dynamics: decoupling compensation and platform damping.

The goal of decoupling compensation is to reduce the size of the generator platform coupling term in the upper-right-block entry of the system matrix (6), the term caused by rotor-relative wind speed (4). According to (22), this term is affected by both $k_\beta$ and $k_\tau$. Setting $$-k_\beta\frac{\partial T_a}{\partial \beta} + k_\tau N_g = H_t\frac{\partial T_a}{\partial v} \quad (16)$$

will fully compensate for the coupling (driving it to zero), but partial compensation can be accomplished using less aggressive gains. If (16) does not hold but the lefthand side is greater than 0, then the coupling will be partially compensated. If the left-hand side is negative, then the coupling will be made worse (e.g., using a platform damper configuration; see below). In Region 3, $$\frac{\partial T_a}{\partial \beta} < 0 \text{ and } \frac{\partial T_a}{\partial v} > 0,$$

so both sides of the equation are positive if $k_\beta > 0$ and $k_\tau > 0$. We can parameterize the PF gains based on their individual contribution to the full compensation represented by (16). Define $$\gamma_\beta = -H_t\frac{\partial T_a}{\partial v}\left(\frac{\partial T_a}{\partial \beta}\right)^{-1}; \gamma_\tau = \frac{H_t}{N_g}\frac{\partial T_a}{\partial v} \quad (17)$$

as the full-compensation gain for each actuator in isolation, so $(k_\beta, k_\tau)=(\gamma_\beta, 0)$ and $(k_\beta, k_\tau)=(0, \gamma_\tau)$ are both solutions to (16). We tune each gain relative to its full-compensation $\gamma_\times$ as $$k_\beta=\alpha_\beta\gamma_\beta; \quad k_\tau=\alpha_\tau\gamma_\tau \tag{18}$$

where $\alpha_\beta$ and $\alpha_\tau$ are the fractional contributions of each actuator to the left-hand side of (16). The total degree of compensation $\alpha_{comp}=\alpha_\beta+\alpha_\tau$ represents the fractional change of the relative-wind coupling entry (upper-right block) from open-loop (6) to closed-loop (22) system matrices.

Platform feedback to $\tau$ is not coupled directly to the platform dynamics, so in theory it is an ideal actuator for performing the decoupling compensation. In fact, $\tau$ platform feedback (also called parallel compensation) is capable of completely removing the NMPZs from $G_\beta^{\dot\theta}(s)$ by changing $\mu_a$ in (9) to be:

$$\mu_a = \frac{\partial F_a}{\partial v} - (1-\alpha_\tau)\frac{\partial T_a}{\partial v}\frac{\partial F_a/\partial \beta}{\partial T_a/\partial \beta}. \tag{19}$$

If the degree of torque compensation $\alpha_\tau$ breaks inequality (9), then the MIMO feedback system will not have NMPZs. FIG. 1 shows the two sides of inequality (9) (normalized) for different values of $\alpha_\tau$, and for the controller tunings discussed in Section 3.3. Data points above the dashed line satisfy (9) and have NMPZs. The tuning uses a constant $\alpha_\tau=0.5$, but in this disclosure, we schedule the parameter to expose a wide design space as the dynamics change across Region 3.

While the name "parallel compensation" is sometimes used to refer to general platform feedback to either generator torque or blade pitch, β-feedback compensation approaches use the same actuator as the PI controller so are not fully parallel, so the name does not quite apply. In this disclosure, the term "decoupling compensation" instead refers to platform feedback to either actuator with the goal of reducing the relative-wind coupling term without distinguishing input-output loop architecture.

Increasing the platform damping is possible using blade-pitch platform feedback, shown by the uncoupled platform dynamics (5) in the lower-right block of $A_{cl}$ in (22). The isolated platform DOF in this system matrix block has a second-order characteristic frequency $\omega_{ptfm}$ and damping ratio $\zeta_{ptfm}$ defined as $$\omega_{ptfm} = \sqrt{\frac{K_\phi}{J_\phi}}; \quad \zeta_{ptfm} = \frac{1}{2J_\phi\omega_{ptfm}}\left(D_\phi + H_t^2\frac{\partial F_a}{\partial v} + H_t k_\beta\frac{\partial F_a}{\partial \beta}\right) \tag{20}$$

The platform natural frequency $\omega_{ptfm}$ is fixed by the physical parameters $K_\phi$ and $J_\phi$ when only using proportional feedback of $\dot\phi$, but the damping ratio $\zeta_{ptfm}$ comes from three sources: the hydrodynamic damping $D_\phi$ (positive, constant), relative wind speed coupling $$\frac{\partial F_a}{\partial v}$$

(positive, magnitude depends weakly on operating point), and platform feedback control $k_\beta$ (fully tunable). The sign of $k_\beta$ can be tuned to either increase ($k_\beta<0$) or decrease ($k_\beta>0$) platform damping $\zeta_{ptfm}$. Using $k_\beta<0$ can increase $\zeta_{ptfm}$ at the expense of dynamic coupling, reducing platform motion but amplifying its disturbance on the generator-speed loop. Using instead $k_\beta>0$ for decoupling compensation increases $\alpha_{comp}$ and redistributes the effect of NMPZs, but blade-pitch feedback cannot directly change the location of the zeros. Such a tuning approach stabilizes the generator speed mode at the expense of reducing $\zeta_{ptfm}$ and decreasing the platform stability. Both tuning approaches are explored in designing a MIMO controller in Section 3.3. Inverting (20) with a desired $\zeta_{ptfm}$ implies the following tuning scheme for blade-pitch PF:

$$k_\beta = \frac{2J_\phi\omega_{ptfm}\zeta_{ptfm} - D_\phi - H_t^2\frac{\partial F_a}{\partial v}}{H_t\frac{\partial T_a}{\partial \beta}}. \tag{21}$$

A choice of desired $\zeta_{ptfm}$ implies a tuning for $k_\beta$ and $\alpha_\beta$, after which a choice of $\alpha_{comp}$ implies $\alpha_\tau$ and therefore tunes $k_\tau$. The platform feedback gains are fully determined by these two parameters ($\alpha_{comp}$, $\zeta_{ptfm}$).

The capacity for PF to improve system performance is constrained by the authority of the control actuators at each wind speed. The generator torque actuator is already set to its rated value by the Region-3 baseline controller, and for safety reasons the electromechanical system imposes a strict limit on the maximum generator torque signal to avoid generator damage, assumed to be 120% of rated torque. This is considered a conservative maximum limit well below the actual capabilities of the generator, but it is used in this disclosure so that a combined simultaneous spike of maximum generator torque and generator speed will never make the generator power exceed 150% of rated power. A more nuanced formulation of generator constraints may allow relaxation of this torque limit, enabling greater control authority but also requiring a more complex controller implementation. A simple saturation to $\tau_{max}=1.2\cdot\tau_{rated}$ is applied to $\tau$ after $\tau_{pf}$ is added to $\tau_{rated}$, potentially introducing nonlinear behavior if the input signal is cut off by the saturation limit. This saturation can be avoided by restricting the torque PF gain $k_\tau$, thereby limiting control authority. In this disclosure, $k_\tau$ is constrained by the $\tau$ saturation limit assuming a maximum platform pitch rate $\dot\phi_{max}$ that depends on the operating point and the platform pitch damping $\zeta_{ptfm}$. Designer intuition can choose tuning parameters to construct a workable controller based on these equations, but optimization over the stability landscape offers a better consideration of the involved trade-offs. Jointly optimized PI and PF tuning is explored in Section 3.3.

3.1.3 Closed-Loop System.

The overall controller gain matrix $K_x=K_x^{pi}+K_x^{pf}$ is combined with the openloop state-space model (6) as $$A_{cl} = A - BK_x = \begin{bmatrix} 0 & 1 & 0 & 0 \\ -k_i \frac{N_g}{J_r} \frac{\partial T_a}{\partial \beta} & \frac{N_g}{J_r}\left(\frac{\partial T_a}{\partial \Omega} - k_p \frac{\partial T_a}{\partial \beta}\right) & 0 & \frac{-N_g}{J_r}\left(H_t \frac{\partial T_a}{\partial v} + k_\beta \frac{\partial T_a}{\partial \beta} - k_\tau N_g\right) \\ 0 & 0 & 0 & 1 \\ -k_i \frac{H_t}{J_\phi} \frac{\partial F_a}{\partial \beta} & \frac{H_t}{J_\phi}\left(\frac{\partial F_a}{\partial \Omega} - k_p \frac{\partial F_a}{\partial \beta}\right) & \frac{-K_\phi}{J_\phi} & \frac{-1}{J_\phi}\left(D_\phi + H_t^2 \frac{\partial F_a}{\partial v} + H_t k_\beta \frac{\partial F_a}{\partial \beta}\right) \end{bmatrix} \quad (22)$$

The block structure of $A_{cl}$ is identical to that of (6). An alternative representation of the closed-loop system uses MIMO transfer functions for the system (8) and controller: $K_y(s) = K_y^{pi}(s) + K_y^{pf}(s)$. The resulting closed-loop system is the 2×2 transfer function $G_{cl}(s) = (I + G(s)K_y(s))^{-1}G(s)K_y(s)$. The transfer function form is easier to manipulate for frequency-domain analysis and controller optimization performed in MATLAB, but the state-space model is easier to conceptually understand in the context of the tuning parameterization used here.

3.2 Robust Stability.

FIG. 7 shows a block diagrams 150 representing various SISO and MIMO loop transfer functions according to embodiments of the present disclosure. The various SISO and MIMO loop transfer functions are used to compute the stability margins of a MIMO closed-loop system. A first diagram 152 represents (A) the SISO loop, a second diagram 154 represents (B) the standard MIMO loop, and a third diagram 156 represents (C) the feedback coupled (FC) MIMO loop. Single lines represent scalar signals while double lines indicate vector signals. The red arrow entering each feedback loop at the plant output is a fictitious disturbance input used to derive the sensitivity function as the transfer function from the disturbance to the measured output. The dashed block outline in (A) is the SISO inner-loop plant $G_{inner}(s)$ incorporating MIMO platform feedback. The dashed block outline in (B) is the combined PI and PF MIMO controller, $K_y(s) = K_y^{pi}(s) + K_y^{pf}(s)$. The dashed block outline in (C) is the feedback-coupled construction used for exposing the plant dynamics to the sensitivity function, and after recoupling the model with feedback, this inner loop is equivalent to the unmodified open-loop plant G(s). Note that each closed-loop transfer function from reference (assumed 0) to output is identical.

The closed-loop system formulated above (22) is not guaranteed to be stable, especially for FOWT platforms with low natural damping like the SpiderFLOAT platform. The stability of a linear feedback system can be analyzed using Nyquist's stability criterion. The stability criterion offers not only a binary answer between stable or unstable but can also be used to quantify the robustness of a nominally stable system against model uncertainty. In this disclosure, control parameters are optimized to seek out a large stability margin and ensure a nominally stable system. Multiple sensitivity function formulations exist for evaluating the stability margins of the MIMO feedback system, and these are depicted by block diagrams in FIG. 7.

The stability margin $S_m$ of a closed-loop-stable SISO system is defined as the minimum distance between the Nyquist curve of the loop transfer function $L(s) = G(s)K(s)$ (where G(s) is the SISO open-loop plant and K(s) is a SISO controller) and the stability boundary at $s = -1$. An equivalent and more easily computable definition is the inverse of the $\mathcal{H}_\infty$-norm of the sensitivity function (denoted S(s)), defined as $$S(s) = (1 + L(s))^{-1}; \quad S_m = \frac{1}{\sup_{\omega \in \mathbb{R}}|S(j\omega)|}. \quad (23)$$

This SISO stability margin has been used to robustly tune a baseline PI controller for a FOWT system. By replacing the open-loop plant G(s) with a SISO transfer function resulting from the inner-loop closure of MIMO PF loops $G_{inner}(s)$, the SISO stability margin may also be used to quantify the robustness of a MIMO feedback system, as in FIG. 7, loop A. This inner-loop SISO formula does not completely capture MIMO loop coupling, but the SISO stability margin is used to tune a robust SISO PI controller in Section 3.3.

To design MIMO controllers in this disclosure, we instead use a MIMO formulation of the sensitivity function defined around a MIMO loop transfer function L(s), most commonly defined around the feedback loop from an output disturbance vector to the system output: $L(s) = G(s)K(s)$ (where G(s) is the MIMO open-loop plant and K(s) is a MIMO controller gain matrix), as depicted in FIG. 7, loop B. The $\mathcal{H}_\infty$-norm of a MIMO transfer function is computed similarly to (23), as the peak gain of the MIMO sensitivity function $S(s) = (I + L(s))^{-1}$, upper-bounded by the largest matrix singular value $\bar{\sigma}(S(s))$. The $\mathcal{H}_\infty$-norm is defined as:

$$S_m = \|S\|_{\mathcal{H}_\infty}^{-1} = \left[\sup_{\omega \in \mathbb{R}} \bar{\sigma}(S(j\omega))\right]^{-1}. \quad (24)$$

Implicit in this MIMO formulation is the need to re-scale the input/output signals of L(s) to remove dimensionality.

When applied to the FOWT system, this simplistic MIMO stability margin formulation (24) is highly sensitive to input/output scaling and tends to underestimate the stabilizing impact of platform feedback. To best capture the coupling between control loops and natural dynamics, a new MIMO stability margin is developed for this disclosure using a loop transfer function modified from the standard feedback loop product G(s)K(s). This modified sensitivity formulation is referred to as the MIMO feedback-coupled (FC) stability margin. To formulate the MIMO FC stability margin, the relative-wind dynamic coupling in the FOWT model (4) is first removed from the open-loop MIMO plant G(s) to form the decoupled plant model $G_{fc}(s)$. Then the coupling is reintroduced as a control-like feedback loop by the sparse gain matrix $K_y^{fc}(s)$. The feedback coupled loop transfer function is:

$$A_{fc} = \begin{bmatrix} 0 & 1 & 0 & 0 \\ 0 & \frac{N_g}{J_r}\frac{\partial T_a}{\partial \Omega} & 0 & 00 \\ 0 & 0 & 0 & 1 \\ 0 & \frac{H_t}{J_\phi}\frac{\partial F_a}{\partial \Omega} & \frac{-K_\phi}{J_\phi} & \frac{-D_\phi}{J_\phi} \end{bmatrix}; \quad G_{fc}(s) = C(sI - A_{fc})^{-1}B \quad (25)$$

-continued $$K_y^{fc}(s) = \begin{bmatrix} 0 & H_t \\ 0 & 0 \\ 0 & 0 \end{bmatrix}; L_{fc}(s) = [I + G_{fc}(s)(K_y(s) + K_y^{fc}(s))]^{-1}$$

Note that the $$\frac{-N_g}{J_r} H_t \frac{\partial T_a}{\partial v}$$

entry in the upper-right block of A is missing from $A_{fc}$. The MIMO FC stability margin calculation proceeds as (24) using the FC loop transfer function $L_{fc}$, also depicted in FIG. 7, loop C. Robustly tuned SISO and MIMO controllers are designed using (23) and (25) in Section 3.3 and compared against manually tuned SISO and MIMO controllers, first by analysis of the stability margin across the design space, and then by nonlinear simulations in Section 4.

3.3 Controller Tuning.

FIG. 8 is a table 160 showing structured FOWT controllers according to the present disclosure. The structured FOWT controllers formulated in Section 3.1 are now tuned to construct a set of controllers representative of conventional and stability-aware tuning approaches.

FIG. 9 is a table 164 showing a division of each controller into PI and PF components according to embodiments of the present disclosure. In some embodiments six controllers can be synthesized in total, each controller consisting of a PI and PF component tuned incrementally (jointly in the case of MIMO Robust). There may be four distinct PI and PF tuning approaches shared between the six controllers. The table 164 also illustrates the incremental design approach taken in this disclosure from manual PI, to robust SISO, to manual PF, to robust MIMO controller tuning.

Figure 11A:
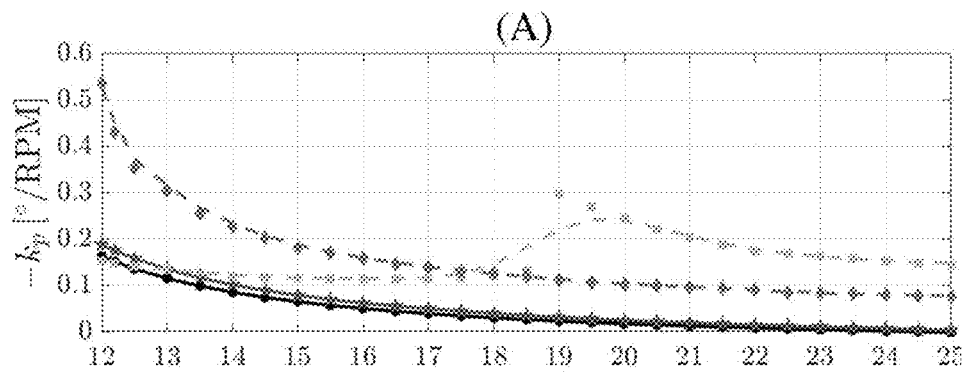
FIG. 11A is analogous to FIG. 10A, but shows the operating schedule of proportional feedback gains according to embodiments of the present disclosure.
Figure 11B:
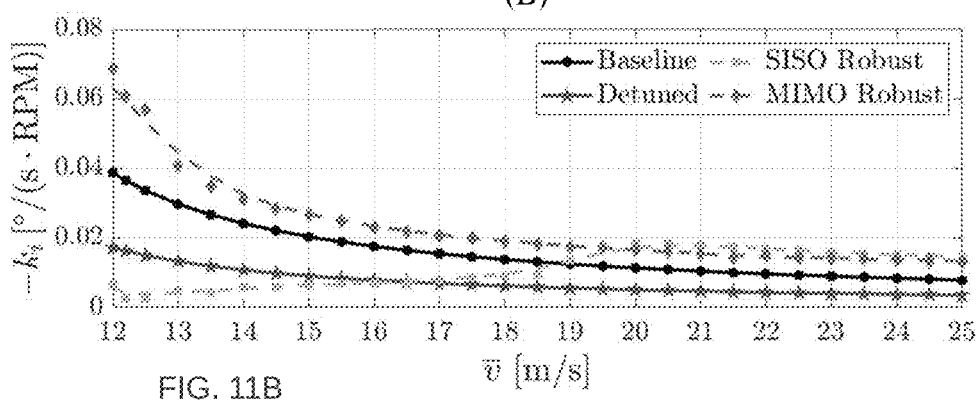
FIG. 11B is analogous to FIG. 10B, but shows the operating schedule of integral feedback gains according to embodiments of the present disclosure.
Figure 11C:
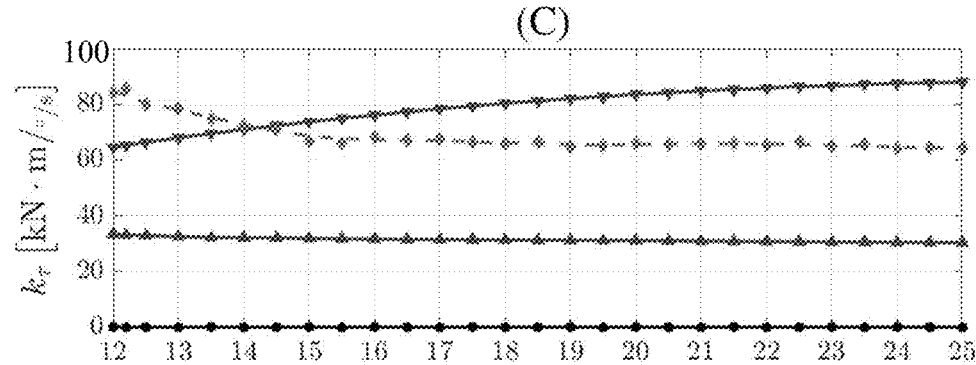
FIG. 11C is analogous to FIG. 10C, but shows the operating schedule of generator torque platform feedback gains according to embodiments of the present disclosure.
Figure 11D:
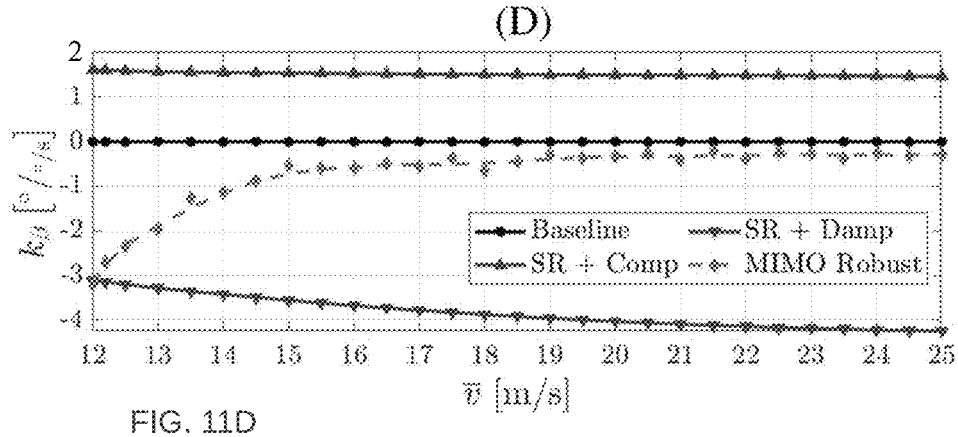
FIG. 11D is analogous to FIG. 10D, but shows the operating schedule of blade pitch platform feedback gains according to embodiments of the present disclosure.

FIGS. 11A and 11B are operating schedules of PI controller parameters according to embodiments of the present disclosure for the components listed in FIG. 9. FIGS. 11C and 11D are operating schedules of PI controller parameters according to embodiments of the present disclosure for the components listed in FIG. 9. The marker shapes used to identify controllers in this figure are consistent across all figures in this disclosure. Dashed lines indicate that the parameters were derived using robust optimization, then smoothed at the raw-gain level to remove steep transitions between operating points. For these curves, the markers indicate the optimized parameter solutions while the corresponding dashed curve follows the smoothed schedule.

Figure 10C:
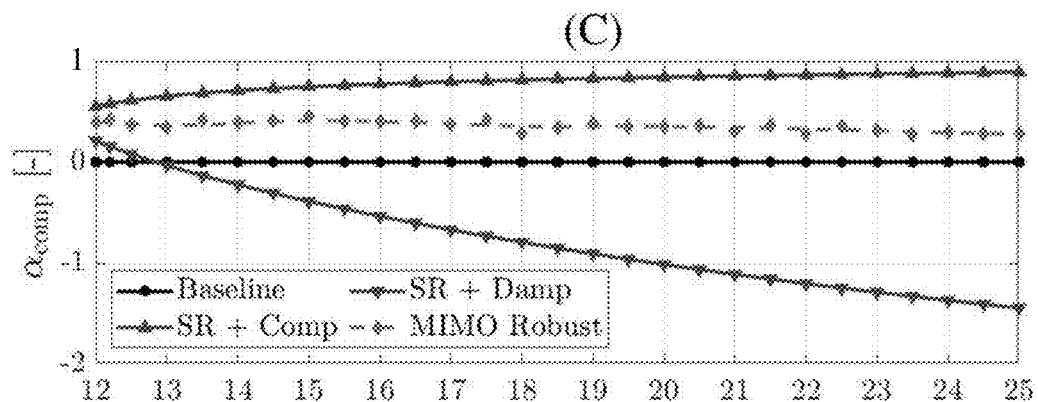
FIG. 10C is an operating schedule of PF controller parameters according to embodiments of the present disclosure.
Figure 10D:
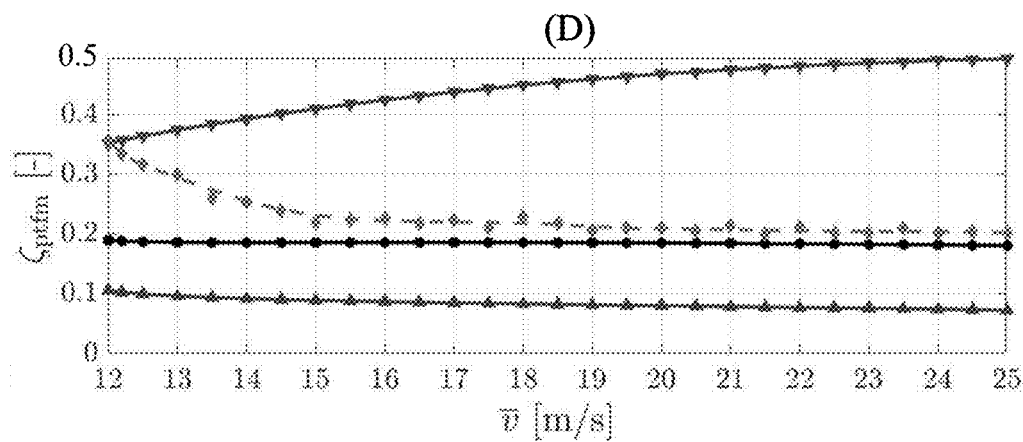
FIG. 10D is an operating schedule of PF controller parameters according to embodiments of the present disclosure.

Schedules for each control parameter are shown across Region 3 in FIG. 10 for the PI (FIGS. 10A and 10B) and PF (FIGS. 10C and 10D) components in FIG. 9. The feedback gains derived from the tuning parameters using (13), (18), and (20) are shown in FIG. 11A-D.

Three PI controllers are tuned as the initial design step: Baseline, Detuned, and SISO Robust. These are SISO controllers, with zero (Baseline) platform feedback. Differentiating the SISO control design in this disclosure is the PI controller parameterization and robust optimization of the PI gains over a two-dimensional design space. SISO Robust could serve as a stabilizing baseline controller to compare advanced control design, and in this disclosure SISO Robust is used as the baseline to compare the simulation performance of MIMO controllers. To introduce MIMO feedback to the FOWT controller, SISO Robust is augmented with two PF tunings, decoupling compensator (Comp) and platform damper (Damp), without modifying the SISO Robust PI tuning. Finally, the PI and PF components are jointly optimized in the MIMO Robust controller. MIMO Robust has both PI and PF tunings not shared with any other controller, seen by its row-column isolation in FIG. 9.

3.3.1 SISO Controller Tuning.

The Baseline PI controller is adapted from ROSCO and tuned with constant desired $\omega_{pi}=0.3$ rad/s and $\zeta_{pi}=0.7$. The filtering of feedback loops included in ROSCO are used in the PI controller implementation and stability analysis in this disclosure. Although the closed-loop natural frequency $\omega_{pi}$ is below the platform resonant frequency, the stability analysis in later sections shows that this controller destabilizes the system at operating points near rated.

The Detuned PI controller follows a common rule of thumb to avoid negative damping: reduce the bandwidth of the generator-speed control loop. The PI control parameters are still constant but modified from the baseline with the goal of improving the stability properties. The desired closed-loop natural frequency is decreased to $\omega_{pi}=0.2$ rad/s to reduce the bandwidth, and the damping ratio is increased to $\zeta_{pi}=1.2$ to reduce oscillations in the system response. The decreased natural frequency demands a smaller integral gain $k_i$, which has a large influence on the closed-loop stability. A large damping ratio $\zeta_{pi}>1$ makes the generator-speed control loop overdamped, dramatically reducing oscillations but also further decreasing the disturbance-rejection bandwidth. The simple detuning design approach is attractive for its lack of complexity, but it is not guaranteed to restore stability at low winds, and the reduced bandwidth also struggles to maintain regulation performance in the presence of greater disturbances at high winds.

The SISO Robust (SR) PI controller does not attempt to maintain constant tuning parameters. The PI parameter schedule $(\omega_{pi}, \zeta_{pi})$ was optimized over the SISO stability margin from Section 3.2 independently at each operating point. The resulting schedules for $\omega_{pi}$ and $\zeta_{pi}$ are plotted in FIGS. 11A and 11B to compare with the approximately constant Baseline and Detuned schedules. Two trends dominate the behavior, split between low winds (increasing $\omega_{pi}$) and high winds (maximal $\omega_{pi}$).

At these lower winds, the PI gains grow rather than following the aerodynamic-sensitivity-induced trend of the constant-parameter PI schedules of Baseline and Detuned. At higher winds, the parameters are mostly constant, similar to the other controllers but at different parameter values. The reasons for the discontinuity in the parameter schedule at around $\bar{v}=19$ m/s are discussed below in Section 3.4. FIGS. 12A, 12B, 12C, and 12D are charts analogous to FIGS. 11A, 11B, 11C, and 11D, respectively but showing the feedback gains used in the implementation of the multi-loop controller.

3.3.2 MIMO Controller Tuning.

The Decoupling Compensator, or Comp, PF tuning attempts to make $\alpha_{comp}$ close to 1 despite some reduction of $\zeta_{ptfm}$. Both generator-torque and blade-pitch PF loops are tuned for compensation, so $\alpha_\tau>0$ and $\alpha_\beta>0$, leading to a large sum $\alpha_{comp}=\alpha_\beta+\alpha_\tau$. The torque compensation gain $k_\tau$ is limited by the actuator saturation under maximum expected platform velocity $\dot{\phi}$ in the feedback loop. This implies a limit to the torque compensation degree $\alpha_\tau$ dependent on platform damping $\zeta_{ptfm}$, itself decreasing as blade-pitch compensation degree $\alpha_\beta$ increases. Based on heuristically estimating the maximum $\dot{\phi}$ based on $\zeta_{ptfm}$, a trade-off is made between $\alpha_\tau$ and $\alpha_\beta$ to maximize the sum $\alpha_{comp}$ without suffering too large a reduction in $\zeta_{ptfm}$. The Comp PF controller is combined with the SISO Robust PI controller to form a complete MIMO controller without retuning the PI parameter schedule. The Comp PF parameter schedules are shown in FIGS. 10C and 10D. Note $\alpha_{comp}$ is large compared to the Baseline ($\alpha_{comp}=0$) and increases at higher winds to be near unity, but $\zeta_{ptfm}$ is reduced by half.

The Platform Damper, or Damp, PF tuning takes the opposite approach: attempting to drive $\zeta_{ptfm}$ higher at the expense of decreasing $\alpha_{comp}$. The generator-torque PF, which has no direct impact on $\zeta_{ptfm}$, is still tuned for compensation $\alpha_\tau > 0$, but the blade-pitch PF is tuned with the opposite sign $\alpha_\beta < 0$. The advantage of increased platform damping is reduced platform motion and therefore structural loads, although the increased dynamic coupling causes the remaining platform motion to have a greater disturbance on the PI control loop. The same maximum $\phi$-heuristic as Comp is used to tune Damp, and because increased platform damping reduces platform motion, the Damp PF actually enables a larger torque compensation $\alpha_\tau$ than Comp (but lower, even negative, total compensation $\alpha_{comp}$). The presence of NMPZs in $G_\beta^\theta(s)$ depends only on the partial compensation $\alpha_\tau$, so Damp PF is better able to remove NMPZs at lower wind speeds (see FIG. 7). The Damp PF parameter schedules are shown in FIGS. 11C and 11D. At high wind speeds near cut-out, the blade-pitch dynamic sensitivity grows to overshadow the contribution of torque PF, so $\alpha_{comp}$ decreases significantly. Eventually, when $\alpha_{comp} < -1$, the dynamic coupling term in the upper-right block of $A_{cl}$ for Damp is doubled from the Baseline natural dynamics.

The MIMO Robust controller attempts to find a compromise between Comp and Damp PF tunings, while retuning the PI control loop jointly to take advantage of increased stability at lower winds. Compared to SISO Robust PI tuning, the MIMO Robust optimization takes advantage of the entire four-dimensional parameter space to find an optimal tuning over the MIMO FC stability margin from Section 3.2. The optimized parameter schedule for the MIMO Robust controller is plotted in FIG. 10A-D. The optimized PF tuning shows an approach favoring $\zeta_{ptfm}$ (similar to Damp) at low winds, while at higher winds $\zeta_{ptfm}$ drops to prevent $\alpha_{comp}$ from reducing too far below Comp. While both actuators are employed for PF at low winds, $k_\beta$ drops almost to zero at high winds and leaves torque PF to perform decoupling compensation at higher winds. The PI gain schedule takes advantage of the increased stability from PF to increase its own bandwidth. The natural frequency $\omega_{pi}$ remains close to 0.4 rad/s (the maximum cutoff) even near rated, and $\zeta_{pi}$ stays at a reasonable value below 2. These values would be impossible to obtain in a stabilizing controller without platform feedback.

3.4 Stability Analysis.

The stability margin varies greatly over operating points and control parameter changes, but visualizing these changes is difficult because of the large design space. Taken together, the controller tuning parameter space ($\omega_{pi}$, $\alpha_{pi}$, $\alpha_{comp}$, $\zeta_{ptfm}$) combined with the scheduling parameter $\bar{v}$ make five independent dimensions. To illustrate variation in the stability margin over the design space, the PI and PF parameter spaces are shown separately as two-dimensional slices across a subsampling of Region 3 operating points: $\bar{v}$=12, 18, 24 m/s. The stability margin is plotted over each 2-D slice as a contour plot, while the other 2+1 parameters are held constant.

Figure 13:
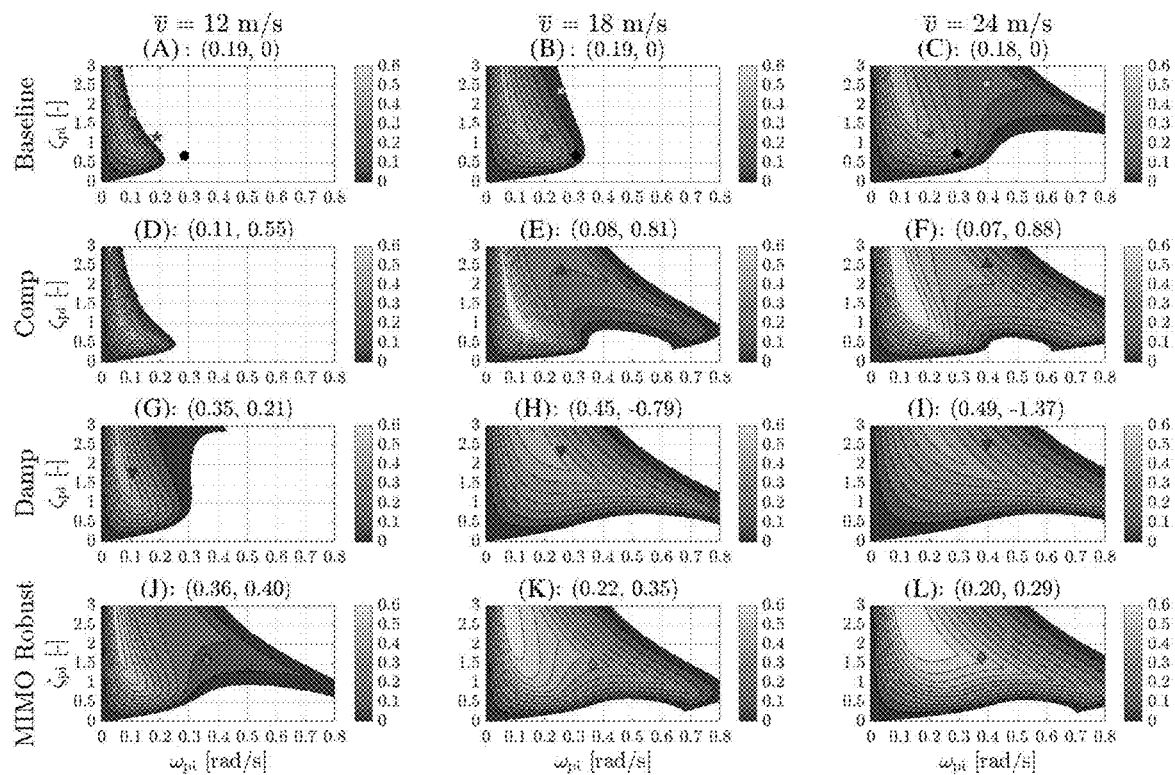
FIG. 13 is series of charts A-L of a Stability margin $S_m$ over the PI parameter space according to embodiments of the present disclosure.
Figure 14:
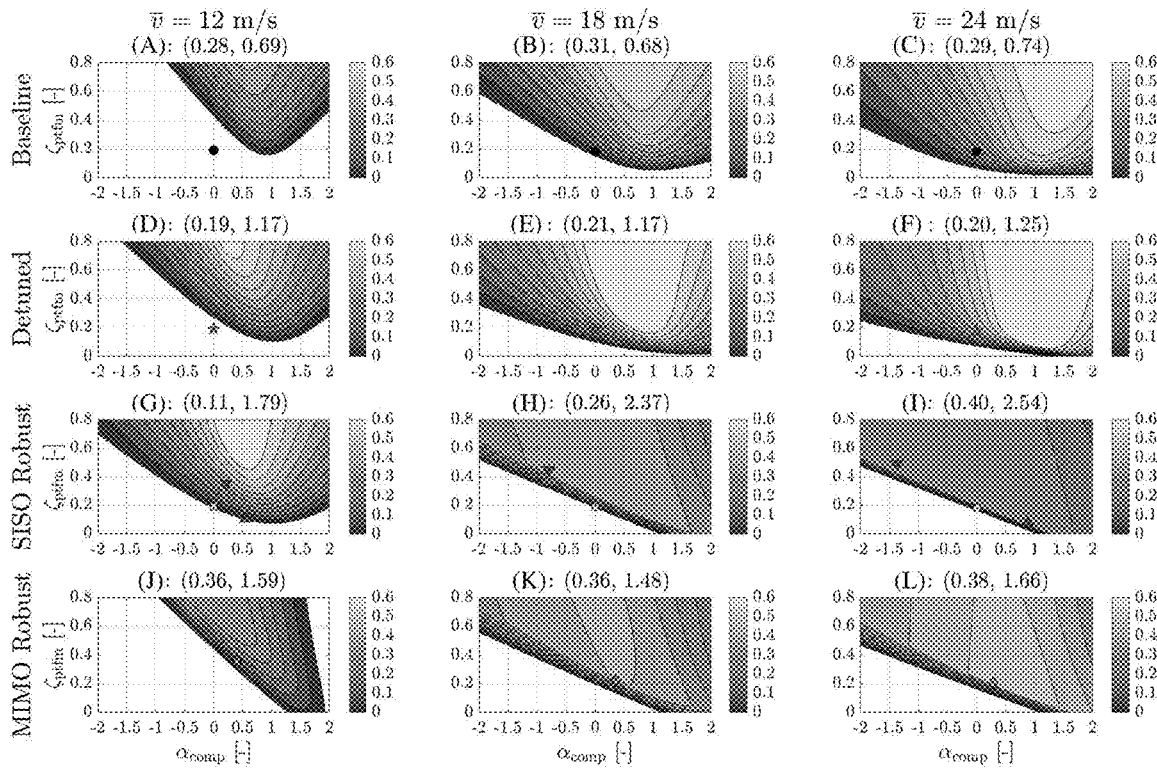
FIG. 14 is a series of charts A-L showing Stability margin $S_m$ over the PF parameter space according to embodiments of the present disclosure.

The PI and PF controller components are considered in turn (refer to Sections 3.1.1 and 3.1.2, respectively). Slices of the PI parameter space ($\omega_{pi}$, $\zeta_{pi}$), sampled using the scheduled PF parameter values of FIGS. 11C and 11D, are shown in FIG. 13. Similarly, slices of the PF parameter space ($\alpha_{comp}$, $\zeta_{ptfm}$), sampled using the scheduled PI parameter values of FIGS. 11A and 11B, are shown in FIG. 14. Although these slices are not a complete picture of the design space, they are selected to inform intuition about general trends in the stability margin across the tuning parameters accessible to feasible control designs.

Figure 12:
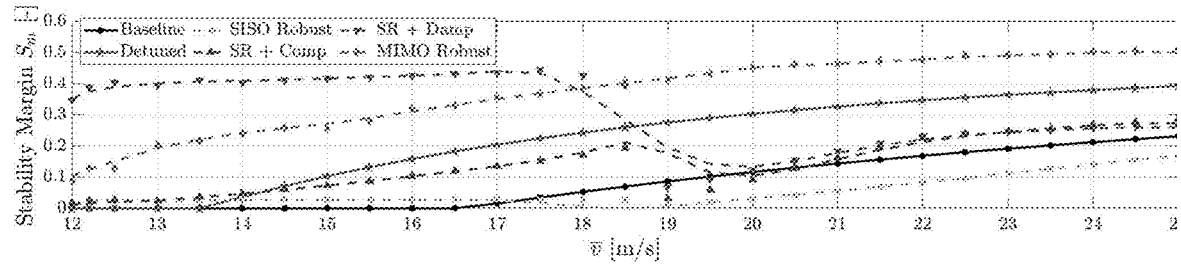
FIG. 12 shows the MIMO FC stability margins for each tuned controller according to embodiments of the present disclosure.

FIG. 12 shows the MIMO FC stability margins for each tuned controller across Region 3 wind speeds, evaluated using the MIMO FC sensitivity function described in Section 3.2. Smoothing of the discontinuous SISO Robust PI gain schedule in FIG. 4 is responsible for a stability margin temporarily near 0 for this controller between $\bar{v}$=18 and $\bar{v}$=19 m/s.

The SISO Robust and MIMO Robust controllers are tuned by optimizing over a cost function based on an estimate of the stability margin and closed-loop bandwidth. The cost function is weighted to encourage a large stability margin $S_m$, disallowing destabilizing controllers where $S_m$=0. The bandwidth of the coupled generator-speed regulation loop is used as a performance estimate and maximized (subject to other goals) by the cost function up to saturation at the platform natural frequency $\omega_{ptfm}$=0.4 rad/s. After the cost function is constructed and weighted, a locally optimal solution is found using a gradient-based solver in MATLAB with a stabilized detuning of the Baseline controller used as an initial condition.

3.4.1 Stability Margin Across PI Parameter Space.

FIG. 13 is series of charts A-L of a Stability margin $S_m$ in over the PI parameter space ($\omega_{pi}$, $\zeta_{pi}$) at three operating points $\bar{v}$=12, 18, 24 m/s (columns). Each plot is a 2D slice of the 4D MIMO controller parameter space ($\omega_{pi}$, $\zeta_{pi}$, $\alpha_{comp}$, $\zeta_{ptfm}$), where the parameters ($\alpha_{comp}$, $\zeta_{ptfm}$) are scheduled at the values indicated in each plot title (rows). The white region of each contour plot is unstable with $S_m$=0. The markers indicate scheduled control parameters of FIGS. 11A, 11B, 11C, and 11D intersecting the slice.

The stability margin is shown across variation in the PI tuning parameters ($\omega_{pi}$, $\zeta_{pi}$) in FIG. 13, under every PF tuning in FIG. 9. As wind speed increases (columns left to right), a segment of the PI parameter space with high natural frequency ($\omega_{pi} > 0.4$ rad/s) appears with unexpectedly high stability margin for certain choices of damping ratio $\zeta_{pi}$, predominantly well-overdamped. This "ridge" of stable solutions enables high control performance without destabilizing the closed-loop system in the process. The non-Baseline platform feedback tunings slightly change the shape of the stability ridge and allow the ridge to start forming at lower wind speeds. Considering the presence of NMPZs (19) in the operating points shown in FIG. 13, the ridge only appears in the PI parameter space at wind speeds higher than the NMPZ cut-off. For a SISO controller (FIG. 13A-C), NMPZs disappear above $\bar{v} \geq 18$ m/s, and this causes the SISO Robust PI gain schedule to jump to a discontinuous optimum at $\bar{v}$=19 m/s, seen in FIG. 10A. Comp and Damp PF tunings (FIG. 13D-I) develop this ridge earlier in the gain schedule, in line with a lack of NMPZs in FIG. 7, but both use the same SISO Robust PI gain schedule so fail to take advantage of the increased robustness afforded by PF. MIMO Robust (FIG. 13J-L) has jointly tuned PI and PF gain schedules, so even at the start of Region 3, it attains a high-natural-frequency PI control loop without becoming unstable, leading to better disturbance rejection but also considerably higher actuator usage in the higher-fidelity simulations of Section 4.

3.4.2 Stability Margin Across PF Parameter Space.

FIG. 14 is a series of charts A-L showing Stability margin $S_m$ over the PF parameter space ($\alpha_{comp}$, $\zeta_{ptfm}$) at three operating points $\bar{v}$=12, 18, 24 m/s (columns). Each plot is a 2D slice of the 4D MIMO controller parameter space ($\omega_{pi}$, $\zeta_{pi}$, $\alpha_{comp}$, $\zeta_{ptfm}$), where the PI parameters ($\omega_{pi}$, $\zeta_{pi}$) are scheduled at the values indicated in each plot title (rows). The white region of each contour plot is unstable with $S_m$=0. The markers indicate scheduled control parameters of FIGS. 11A, 11B, 11C, and 11D intersecting the slice.

The stability margin is shown across variation in the PF tuning parameters ($\alpha_{comp}$, $\zeta_{ptfm}$) in FIG. 14, under every PI tuning in FIG. 9. For conventional PI tunings ($\omega_{pi}$≤0.3 rad/s, $\zeta_{pi}$<2) (FIG. 14A-G), the most notable feature of the PF stability landscape is a ridge of high-stability solutions where $\alpha_{comp}$≈1, distorting somewhat as $\zeta_{ptfm}$ increases. Setting the parameter $\alpha_{comp}$=1 completely removes platform coupling from the generator dynamics (6), so the generator-speed control loop will be undisturbed by any platform motion (to first order). In the context of the inner-loop SISO transfer function from β to $\dot{\theta}$, such full-compensation tuning causes a pole-zero cancellation that effectively reduces the system order to include only the generator speed and azimuth states. A more aggressive PI tuning, such as MIMO Robust (FIG. 14J-L) or high-wind SISO Robust (FIG. 14H-I) shows a different picture of optimally stable tuning solutions. This evolution of the model-based optimization landscape across the design space shows the benefits of gain scheduling through automated optimization. While the stability landscape is by no means convex, the gradient based optimization solver is able to navigate to more desirable regions of the high-dimensional design space than is easily accomplished by manual tuning, resulting in the relatively smooth MIMO gain schedule in FIG. 10.

4. Simulation Results

The USFLOWT system was simulated with each of the six controllers designed in Section 3. The nonlinear aero-hydro-servo-elastic tool OpenFAST was used to model USFLOWT, and the controller was implemented in Simulink. At each Region 3 mean wind speed v=12, 13, . . . , 25 m/s, corresponding wave conditions are informed by met-ocean data for a site near Monhegan Island, Maine. The wave conditions used the JONSWAP spectrum with parameters correlated with wind speed. Significant wave height ranged from $H_s$=1.18 m at 12 m/s to $H_s$=3.44 m at 25 m/s, and peak period ranged from and $T_p$=7.27 s at 12 m/s to $T_p$=9.32 s at 25 m/s. While an irregular wave disturbance was simulated in every case, it has not been found to have a significant impact on the SpiderFLOAT platform and USFLOWT performance at the peak wave frequencies of operational conditions, justifying the lack of wave disturbance in the control design model (6). TurbSim was used to simulate a wind field with 16% characteristic turbulence intensity with a 10-min mean at each integer Region 3 wind speed. The wind field was generated using the International Electrotechnical Commission (IEC) Kaimal spectral model and a vertical shear exponent of 0.14. Twelve random seeds for wind turbulence and wave power spectrum were simulated at each reference wind speed for each controller. All simulations used a duration of 800 s, with the first 200 s of transient settling discarded. An example 180-s segment time series of a simulation with reference wind speed 18 m/s is shown in FIG. 15.

Figure 15:
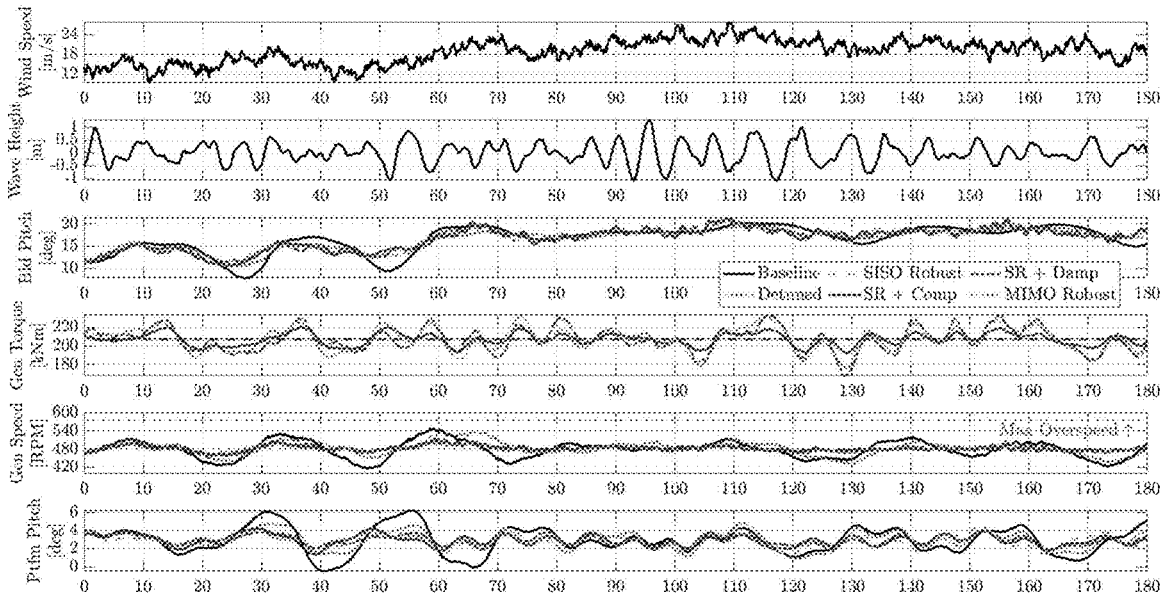
FIG. 15 is a chart showing example time-series simulation results for the USFLOWT system, simulated with each of the controllers described in Section 3.3 at a reference wind speed of 18 m/s according to embodiments of the present disclosure.

FIG. 15 is a chart showing example time-series simulation results for the USFLOWT system, simulated with each of the controllers described in Section 3.3 at a reference wind speed of 18 m/s. The wind and wave disturbances generated with each random seed were the same for all controllers.

The states included in the control design model (6) are used to analyze simulation results across all Region 3 mean wind speeds. The generator-speed error $\tilde{\dot{\theta}}$ is normalized to the rated value $\Omega_{rated}$, and the platform pitch $\tilde{\phi}$ is normalized to the mean value of the Baseline controller at v=12 m/s. Note that due to the presence of some low-frequency turbulence, the performance data for each reference wind speed is blurred with that of adjacent wind speeds, but the trends between lower and higher winds are useful for comparison of behavior between controllers.

Power quality, a measure of the output power variation, plays a role in the suitability of a power generation system to be integrated into the grid. As wind energy grows to contribute a larger portion of the grid power resource, any negative impacts on the quality of power in the grid distribution are more pronounced. Although the grid can make use of power electronics designed to reactively compensate for the reduction in power quality expected from renewable sources, power quality may still be a factor in FOWT design decisions. In addition to the states of the simplified model, the variation of output power is also used to compare controller designs. The power-output equation and its linearization are:

$$P=\tau\dot{\theta}; \tilde{P}=\tilde{\tau}\Omega_{rated}+\tau_{rated}\tilde{\dot{\theta}} \quad (26)$$

Note the dependence of power variation $\tilde{P}$ on input torque $\tilde{\tau}$. In a SISO controller, torque is constant and the generator power in Region 3 is directly related to the generator speed. In a MIMO controller, feedback to $\tilde{\tau}$ may either increase or decrease power variation relative to generator speed. The platform feedback via (14b) used in this disclosure tends to increase power variation.

Some higher-order FOWT system behaviors are relevant to comparing performance but not captured by the simplified design model. These include mean power output, actuator usage, and structural loading of various mechanical components. Each of these quantities is aggregated over Region 3 by weighting the simulation output statistics at each wind speed based on the wind-speed probability.

The six controllers described in Section 3 are compared in two stages. The simulation results of the three SISO controllers are discussed in Section 4.1 and compared against the destabilizing Baseline in FIG. 16. The simulation results of the three MIMO controllers are discussed in Section 4.2 and compared against the SISO Robust PI controller. Additional aggregated performance statistics are discussed in Section 4.3.

4.1 SISO Controller Performance Comparison.

Figure 16A:
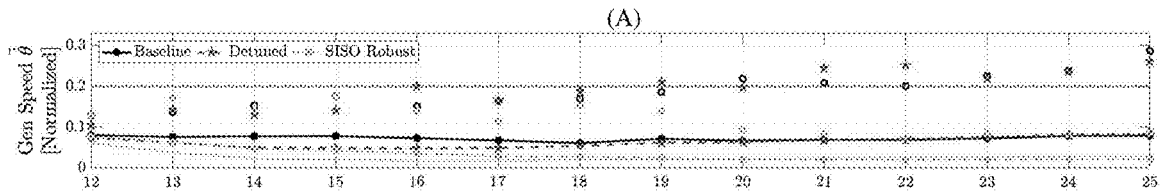
FIG. 16A shows the generator speed error of the SISO controllers described in Section 3.3 over twelve seeds at each reference wind speed according to embodiments of the present disclosure.
Figure 16B:
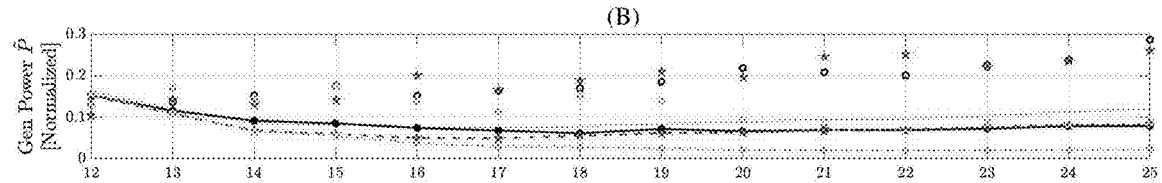
FIG. 16B shows the generator power variation of the SISO controllers described in Section 3.3 over 12 seeds at each reference wind speed according to embodiments of the present disclosure.
Figure 16C:
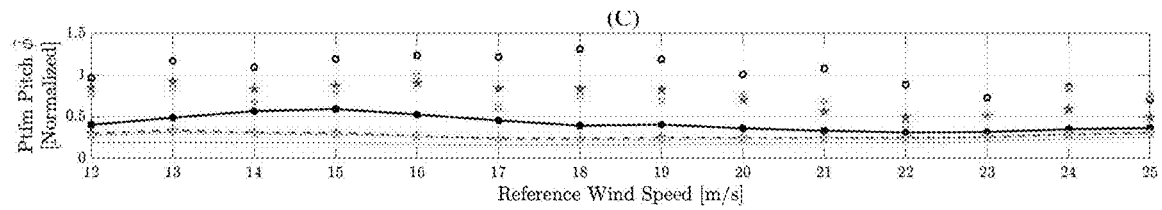
FIG. 16C shows the platform pitch variation of the SISO controllers described in Section 3.3 over 12 seeds at each reference wind speed according to embodiments of the present disclosure.

FIG. 16A shows the generator speed error of the SISO controllers described in Section 3.3 over twelve seeds at each reference wind speed. FIG. 16B shows the generator power variation of the SISO controllers described in Section 3.3 over 12 seeds at each reference wind speed. FIG. 16C shows the platform pitch variation of the SISO controllers described in Section 3.3 over 12 seeds at each reference wind speed.

In each of FIGS. 16A, 16B, and 16C, the connected markers indicate the signal standard deviation (STD), and the disconnected markers indicate the maximum, both normalized to a rated value. The faint line denotes the STD of the MIMO Robust controller from FIGS. 18A, 17B, and 17C discussed below. The dashed line at 0.2 in (A) shows the 20% safety threshold for maximum generator overspeed.

FIG. 16A shows the normalized generator speed error of each SISO controller. The generator speed STD of the Baseline controller stays at a consistent level at every wind speed, with a larger error deviation than the other SISO controllers. At high wind speeds $\bar{v} \geq 20$ m/s, the maximum overspeed error of Baseline exceeds the required 20% safety threshold, indicating that this controller may lead to a turbine shutdown during field operation. The Detuned controller has reduced STD error over the Baseline at lower wind speeds due to its increased stability, but at higher winds the STD error is at or above that of the Baseline, and overspeed errors violate the safety constraint as frequently. Generator speed tracking performance is improved by the SISO Robust PI controller at all wind speeds. While the overspeed error occasionally surpasses that of the other PI controllers at low wind speeds, it never exceeds the 20% safety threshold. The performance benefits of the SISO Robust tuning become most apparent at higher wind speeds, where both the STD and max error signals stay significantly below those of either other PI controller. The SISO Robust performance improves dramatically relative to the other controllers at wind speeds above 19 m/s, where the stability landscape allows a PI controller to achieve both high stability margin and high bandwidth.

FIG. 16B is nearly identical to FIG. 16A because in Region 3 $\tilde{\tau}=0$ for the SISO controllers, implying that $\tilde{P} \propto \tilde{\theta}$. At reference wind speeds near rated, the simulation spends a larger part of its time in Region 2, the variable power region, so fluctuations in generator power are unavoidable and do not reflect the Region 3 controller performance.

FIG. 16C shows that the Baseline controller has significant variation in platform pitch at low wind speeds $\bar{v} \leq 17$ m/s where the system is unstable, leading to higher tower fatigue loads. The Detuned and SISO Robust controllers reduce platform motion to a similar degree, indicating that this improvement comes almost entirely from higher stability. The robust optimization seems to not reduce platform motion below that accomplished by the simple detuning.

4.2 MIMO Controller Performance Comparison.

Figure 17A:
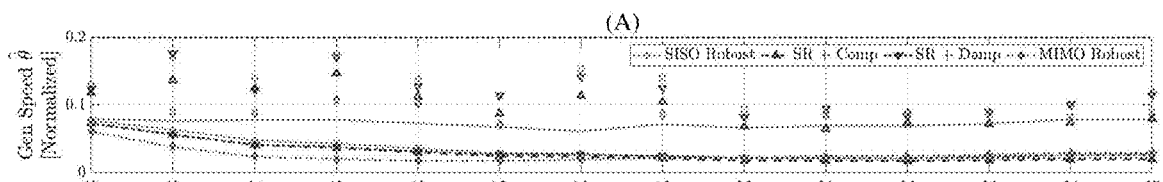
FIG. 17A shows the generator speed error of the MIMO controllers described in Section 3.3 over twelve seeds at each reference wind speed, compared against the SISO Robust PI controller according to embodiments of the present disclosure.
Figure 17B:
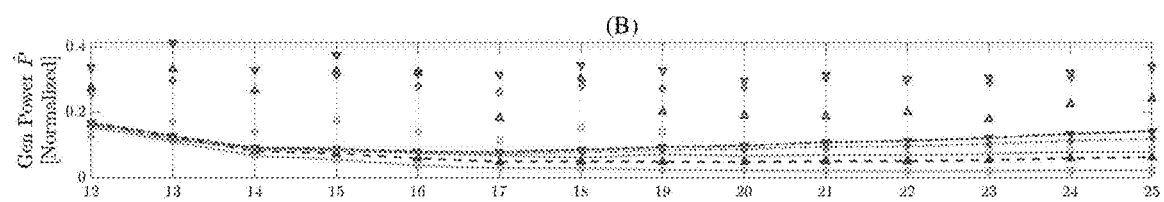
FIG. 17B shows the generator power error of the MIMO controllers described in Section 3.3 over twelve seeds at each reference wind speed, compared against the SISO Robust PI controller according to embodiments of the present disclosure.
Figure 17C:
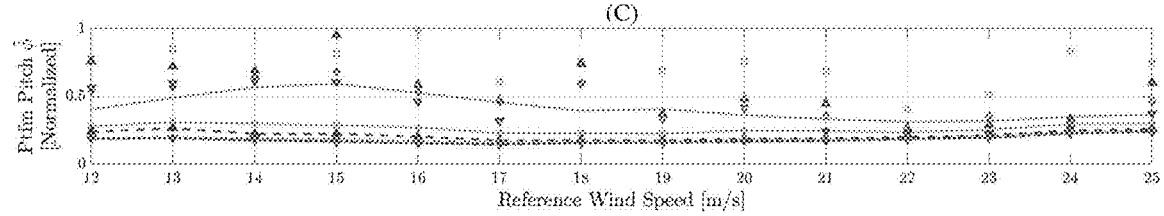
FIG. 17C shows the platform pitch variation of the MIMO controllers described in Section 3.3 over twelve seeds at each reference wind speed, compared against the SISO Robust PI controller according to embodiments of the present disclosure.
Figure 18A:
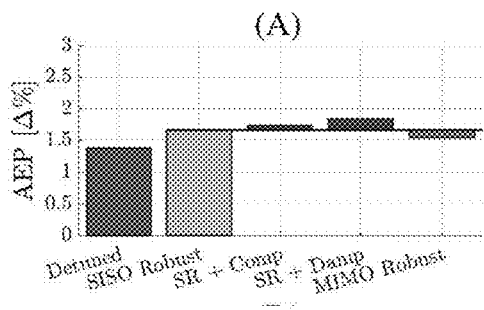
FIGS. 18A-18F compare each controller by the percent change of these statistics according to embodiments of the present disclosure.

FIG. 17A shows the generator speed error of the MIMO controllers described in Section 3.3 over twelve seeds at each reference wind speed, compared against the SISO Robust PI controller according to embodiments of the present disclosure. FIG. 17B shows the generator power error of the MIMO controllers described in Section 3.3 over twelve seeds at each reference wind speed, compared against the SISO Robust PI controller according to embodiments of the present disclosure. FIG. 17C shows the platform pitch variation of the MIMO controllers described in Section 3.3 over twelve seeds at each reference wind speed, compared against the SISO Robust PI controller according to embodiments of the present disclosure.

In each of FIGS. 17A, 17B, and 17C, the connected markers indicate the signal standard deviation (STD) and the disconnected markers indicate the maximum, both normalized to a rated value. The faint gray line denotes the STD of the Baseline PI controller from FIG. 16. The dashed line at 0.2 in FIG. 17A shows the 20% safety threshold for maximum generator overspeed.

In FIGS. 17A, 17B, and 17C, the performance of all MIMO control approaches is compared against the SISO Robust PI controller. The incremental construction of the SR+Comp and SR+Damp controllers allows us to evaluate the benefits of platform feedback without changes to the underlying generator-speed-regulating gain schedule so that the distinct advantages of the Comp and Damp PF approaches are exposed. The MIMO Robust controller represents a full MIMO retuning that more completely explores the design landscape. FIGS. 17A-17C show that the MIMO Robust controller has a less aggressive PI control loop than SISO Robust PI tuning (at least at high wind speeds) and is a more balanced approach to platform feedback than the Comp and Damp controllers.

FIG. 17A compares the generator speed error performance of MIMO controllers. Introducing Comp PF provides a mild improvement to STD error over SISO Robust, although the dramatic improvement of SISO Robust over the Baseline (see the faint gray line) leaves less room for further error reduction. Damp PF improves STD error to the same degree as Comp at low wind speeds, but at high wind speeds the STD error becomes slightly worse. This can be attributed to the extreme damping exacerbating model coupling at high $\bar{v}$, eventually more than doubling the natural coupling when $\bar{v}>20$ m/s. The most notable distinction of the MIMO Robust controller occurs at wind speeds less than 18 m/s due to the more aggressive PI tuning allowed because of platform feedback. Retuning the PI control parameters in the presence of PF loops leads to a more capable controller than simply adding a MIMO component to a pre-tuned SISO controller, at least near rated. From a practical point of view, the difference in generator speed error between the controllers in FIG. 17A-17C at high winds would be outweighed by other performance considerations. Now, the power variation in FIG. 17B includes contributions from both generator-speed error in FIG. 17A and generator-torque feedback, showing a pronounced drawback of $\tau$-based PF. This feedback often causes $\tau$ spikes to occur as a preventative measure at the same time the generator is speeding up, leading to a combined power fluctuation larger than generator speed error alone. All MIMO controllers increase power variation over the SISO Robust controller due to the direct feedthrough impact of (14b). The amount of increased power variation is highly correlated with the torque feedback gain $k_\tau$, shown in FIG. 17C. The SR+Damp and MIMO Robust controllers have the highest power fluctuation at high winds due to large $k_\tau$ gain in the PF tuning. If power quality is considered a more critical design aspect, then the control design approach should be retuned with lesser torque PF actuation as an explicit objective.

FIG. 17C shows that all PF approaches reduce platform motion compared to SISO Robust without PF. The Comp PF tuning renders the least improvement because it is designed to improve generator speed error at the expense of reduced platform damping. The Damp PF tuning more significantly reduces platform motion, as expected. The MIMO Robust controller achieves platform motion between the Comp and Damp PF approaches at high winds while more closely resembling SR+Damp at lower winds, where it acts as a more aggressive platform damper (see FIG. 17D).

4.3 Additional Region 3 Performance Statistics.

Additional performance statistics not explicitly factored into the control design process are calculated and aggregated over Region 3 to compare controller designs. The outputs considered are AEP, blade-pitch travel, and fatigue and extreme structural loading. The statistics are aggregated by computing the performance at each reference wind speed: mean power, mean blade-pitch velocity, and DEL, then averaged over all wind speeds weighted by the Region 3 Weibull probability distribution for the site. For fatigue loads, the DEL is calculated using rainflow counting with a Wöhler exponent of m=10 for the blades and m=3 for the other components in a modified version of MCrunch. For extreme loads, the aggregate value is the absolute maximum over all wind speeds. FIGS. 18A-18F compare each controller by the percent change of these statistics. The SISO controllers are compared relative to the Baseline performance, and the MIMO controllers are compared relative to the SISO Robust performance.

Annual energy production (AEP) is arguably the most important metric for success of a FOWT system, as it is directly tied to revenue generation in a commercial wind farm. The AEP calculation used for the comparison in FIG. 17A only considers mean power output over Region 3 mean wind speeds. However, the highest-probability winds occur in Region 2, therefore the mean power near rated makes the largest contribution to AEP. Generally, destabilizing FOWT controllers suffer large power fluctuations due to non-decaying generator speed oscillation, so the detuned PI controllers have a significant improvement over the Baseline. The MIMO controllers change the AEP from SISO Robust by only a fraction of a percent. The SR+Damp controller has the highest mean power output but also the largest power variation (see FIG. 17B). By reducing generator-speed overspeed events near rated (FIG. 17A), the MIMO Robust controller suffers a small decrease in AEP.

Figure 18B:
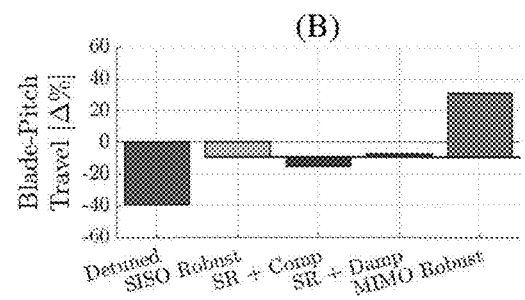
Figure 18C:
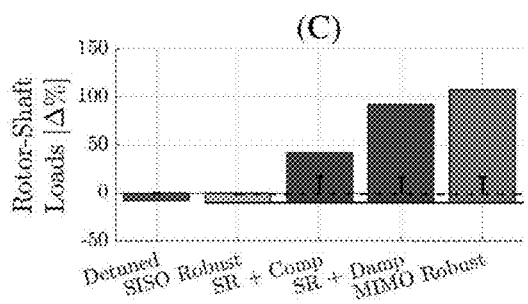

FIG. 18B shows the blade pitch usage, which is correlated with disturbance severity and closed-loop bandwidth. The Detuned controller reduces actuator usage from the destabilizing Baseline due to its reduced bandwidth, caused by both reducing output-signal oscillations near rated and failing to reject disturbances present at higher winds. The SISO Robust controller enables better disturbance rejection, but the actuator usage increases as a consequence. The MIMO Robust controller increases blade-pitch travel, even from Baseline. This increase occurs near rated, where the MIMO Robust PI bandwidth (FIG. 17A) is higher than any other controller. A more moderate tuning of this controller would reduce its actuator usage near rated with some compromise to generator speed tracking.

Rotor-shaft torsional loading, shown in FIG. 17C, is another known drawback of torque feedback in a wind turbine system. The MIMO controllers all increase shaft fatigue loading from SISO Robust, and the extreme loads are constrained by the maximum torque limit. Since a similar degree of shaft loading is also observed using a constant-power Region 3 controller, this is a reasonable tradeoff for the benefit of improved generator-speed regulation brought about by torque platform feedback.

Figure 18D:
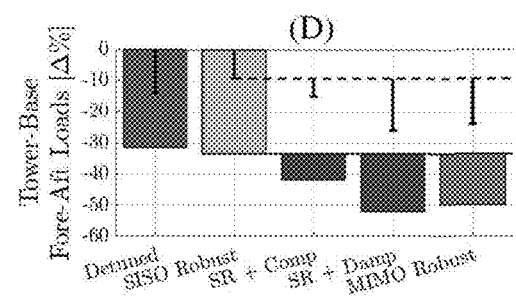
Figure 18E:
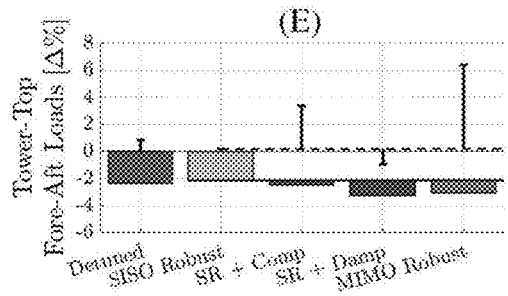

Tower structural loading is shown in FIGS. 18D and 18E, measured or estimated at the tower base and tower top, respectively. Although trends between controllers are similar, the improvement to tower-base loading is a much larger fraction of the Baseline than the improvement to loading at the tower top. Tower loading is highly correlated with platform motion, so the controllers that reduce platform motion in FIGS. 16C and 17C show the greatest tower fatigue reduction. The extreme tower-top loading is less correlated with platform motion and may instead be related to instantaneous high-thrust events, showing worst performance from the MIMO Robust controller that also has the highest blade-pitch travel (FIG. 18B) and blade loading (FIG. 18F) (other than Baseline).

Figure 18F:
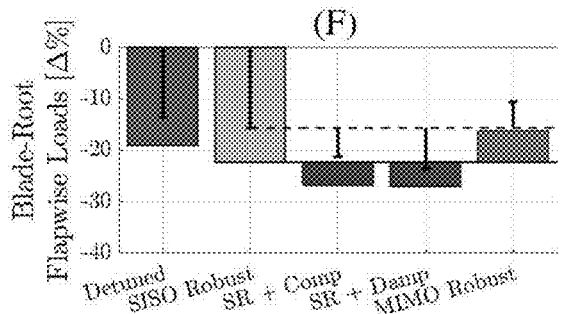

The blade-root structural loading in FIG. 18F is combined for all blades. The trends between controllers are a mixed correlation with platform motion, tower loading, and blade-pitch travel. All controllers reduce blade loads from the Baseline, but the MIMO Robust controller increases blade loading from SISO Robust due to its increased blade-pitch activity in FIG. 18B. Once again, a less aggressive tuning approach for MIMO Robust would serve to reduce the actuator usage and also likely decrease blade loads.

The stability robustness of the USFLOWT closed-loop dynamics has been investigated over a sampling of MIMO controller tuning parameter space. An automated tuning procedure for Region 3 FOWT controllers based on this stability analysis has been used to construct robust SISO and MIMO controllers that are compared against traditional incremental FOWT control design. A robust SISO PI controller compares favorably against a fixed-bottom baseline and a simply detuned controller, similar to other results. Robust PI tuning leads to decreases in tower structural loading while also improving generator-speed regulation and AEP through identifying sections of the parameter space that satisfy both stability robustness and aggressive regulation bandwidth. This aggressive tuning at high wind speeds also increases blade pitch actuator usage as a consequence, but this drawback could potentially be mitigated by reducing the maximum allowed PI bandwidth. Some additional performance benefits arrive from adding MIMO feedback to the robust PI gain schedule with the purpose of compensating dynamic coupling or an increase in platform damping. Independently tuning control loops no longer captures all of the benefits offered by the control loop structure. Improvement is limited if the PI controller is not redesigned in the presence of beneficial platform feedback. A known problem with using generator torque feedback in parallel compensation is an increase in shaft and drivetrain loads and poor power quality, which is becoming more practically critical because of the rising penetration of wind energy in modern power grids. Power quality can be improved by incorporating other MIMO feedback architectures, such as a constant-power controller, or farm-level design decisions such as energy storage.

For measuring robustness of a multi-loop feedback system, a SISO stability margin calculation is too simplistic to capture loop coupling. The direct extension to a conventional MIMO sensitivity function is highly sensitive to dimensional scaling of input and output signals and under-emphasizes the contribution to stability of platform feedback. We have proposed a loop configuration for defining the FOWT sensitivity function that emphasizes FOWT-specific model coupling, the MIMO feedback-coupled (FC) representation. By treating the internal dynamics of a FOWT as a control-like feedback loop, the coupling between natural dynamics and control feedback influence the stability margin calculation in similar ways, improving upon the more simplistic SISO and MIMO sensitivity representations. Examination of the evolution of the stability margin across Region 3 wind speeds and multiple subsamplings of the 4-dimensional control parameter space reveals intuition about how various tuning configurations of each control parameter work together to influence FOWT stability. These parameters may then be optimized over the design space to find a compromise between closed-loop stability margin and disturbance-rejection bandwidth.

Although the MIMO robust controller optimization increases the complexity and computational cost of the automated controller tuning, advantages of full parameter optimization appear at low wind speeds due to the ability to optimally retune a more aggressive generator-speed control loop under the increased stability offered by platform feedback. Such aggressive regulation comes at a cost of power quality, blade pitch actuator usage, and certain structural loads. The "best" performing trade-off depends on the application goals, and cost function tuning allows targeting certain design objectives with application goals in mind. While the intuitively formulated controller proposed in this disclosure may not compare to full-state feedback like that provided by LQR or $\mathcal{H}_\infty$ methods, the relative ease of conceptualization for the performance trade-offs of the isolated loop design space lends the problem well to intuitive design.

The proposed robust controller tuning method has led to improved performance in the targeted metrics, generator-speed regulation and tower loading, despite known modelling inaccuracy due to dynamic simplifications, ignored degrees of freedom, and imprecise parameter identification. One benefit of stability robustness is tolerance to model uncertainty, which allows a controller designed on such a simplified model to maintain performance qualities in non-linear higher fidelity simulation used to validate the control design. Introducing additional model dynamics (such as structural flexibility, floating platform DOFs, and accurate hydrodynamics) could improve the match between the behavior predicted in the design process with the simulation model, but in doing so the dynamics would further depart from designer intuition and increase computation times. Maintaining intuition about which design decisions have positive influence is useful when the design problem is broadened to include additional plant parameters, and automated tuning facilitates fast redesign suitable for a control co-design process flow. The simplicity of a few-DOF control design model is compensated for by robust tuning, allowing better understanding and performance for the designer and controller.

FIG. 19 illustrates example components of a system 200 that may comprise or implement aspects of one or more disclosed embodiments. For example, FIG. 19 illustrates an implementation in which the system 200 includes processor(s) 202, storage 204, sensor(s) 206, I/O system(s) 208, and communication system(s) 210. Although FIG. 19 illustrates a system 200 as including particular components, one will appreciate, in view of the present disclosure, that a system 200 may comprise any number of additional or alternative components.

The processor(s) 202 may comprise one or more sets of electronic circuitries that include any number of logic units, registers, and/or control units to facilitate the execution of computer-readable instructions (e.g., instructions that form a computer program). Such computer-readable instructions may be stored within storage 204. The storage 204 may comprise one or more computer-readable recording media and may be volatile, non-volatile, or some combination thereof. Furthermore, storage 204 may comprise local storage, remote storage (e.g., accessible via communication system(s) 210 or otherwise), or some combination thereof. Additional details related to processors (e.g., processor(s) 202) and computer storage media (e.g., storage 204) will be provided hereinafter.

As will be described in more detail, the processor(s) 202 may be configured to execute instructions stored within storage 204 to perform certain actions. In some instances, the actions may rely at least in part on communication system(s) 210 for receiving data from remote system(s) 212, which may include, for example, separate systems or computing devices, sensors, and/or others. The communications system(s) 210 may comprise any combination of software or hardware components that are operable to facilitate communication between on-system components/devices and/or with off-system components/devices. For example, the communications system(s) 210 may comprise ports, buses, or other physical connection apparatuses for communicating with other devices/components. Additionally, or alternatively, the communications system(s) 210 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 19 illustrates that a system 200 may comprise or be in communication with sensor(s) 206. Sensor(s) 206 may comprise any device for capturing or measuring data representative of perceivable phenomena. By way of non-limiting example, the sensor(s) 206 may comprise one or more image sensors, microphones, thermometers, barometers, magnetometers, accelerometers, gyroscopes, and/or others.

Furthermore, FIG. 19 illustrates that a system 200 may comprise or be in communication with I/O system(s) 698. I/O system(s) 208 may include any type of input or output device such as, by way of non-limiting example, a display, a touch screen, a mouse, a keyboard, a controller, and/or others, without limitation.

The following discussion is intended to provide a brief, general description of a suitable computing environment in which the present disclosure may be implemented. Although not required, the present disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the present disclosure may be practiced in network computing environments with many types of computer system configurations, including personal computers, hand-held devices, multi-processor systems, microprocessor-based or programmable consumer electronics, network PCs, minicomputers, mainframe computers, and the like. The present disclosure may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

The present disclosure may comprise or utilize a special-purpose or general-purpose computer system that includes computer hardware, such as, for example, a processor and system memory, as discussed in greater detail below. The scope of the present disclosure also includes physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the present disclosure can comprise two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the present disclosure.

Transmission media can include a network and/or data links which can be used to carry program code in the form of computer-executable instructions or data structures, and which can be accessed by a general-purpose or special-purpose computer system. A "network" is defined as data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the present disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The present disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the present disclosure may be practiced in a cloud-computing environment. Cloud computing environments may be distributed. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment, or cloud-computing platform, may comprise a system that includes a host that is capable of running virtual machines. During operation, virtual machines emulate an operational computing system, supporting an operating system and perhaps other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A controller for a floating offshore wind turbine (FOWT) comprising:
   a blade pitch actuator configured to adjust a blade pitch of blades of the FOWT;
   a torque resistance actuator configured to adjust torque resistance of the FOWT;
   a processor; and
   a memory configured to store instructions that, when executed by the processor, cause the controller to perform a method, the method comprising:
   receiving a generator speed and a platform pitch angle as an input to the controller; and
   based, at least in part, upon the input to the controller, adjusting at least one of the blade pitch angle using the blade pitch actuator and the torque resistance using the torque resistance actuator to improve stability of the FOWT,
   wherein a gain scheduler is derived using a multi-input, multi-output (MIMO) system for robustness; and
   wherein the controller executes a combined gain-scheduled proportional-integral (PI) control and platform feedback (PF) control.

2. A controller for a floating offshore wind turbine (FOWT) comprising:

a blade pitch actuator configured to adjust a blade pitch of blades of the FOWT;

a torque resistance actuator configured to adjust torque resistance of the FOWT;

a processor; and a memory configured to store instructions that, when executed by the processor, cause the controller to perform a method, the method comprising:

receiving a generator speed and a platform pitch angle as an input to the controller; and based, at least in part, upon the input to the controller, adjusting at least one of the blade pitch angle using the blade pitch actuator and the torque resistance using the torque resistance actuator to improve stability of the FOWT, wherein a gain scheduler is derived using a multi-input, multi-output (MIMO) system for robustness; and wherein the controller executes a single-input, single output (SISO) proportional-integral control loop and a set of multi-input, multi-output control loops.

3. A controller for a floating offshore wind turbine (FOWT) comprising:

a blade pitch actuator configured to adjust a blade pitch of blades of the FOWT;

a torque resistance actuator configured to adjust torque resistance of the FOWT;

a processor; and a memory configured to store instructions that, when executed by the processor, cause the controller to perform a method, the method comprising:

receiving a generator speed and a platform pitch angle as an input to the controller; and based, at least in part, upon the input to the controller, adjusting at least one of the blade pitch angle using the blade pitch actuator and the torque resistance using the torque resistance actuator to improve stability of the FOWT, wherein a gain scheduler is derived using a multi-input, multi-output (MIMO) system for robustness; and wherein the controller executes a combined gain-scheduled proportional-integral (PI) control and platform feedback (PF) control; and wherein the controller executes a single-input, single output (SISO) proportional-integral control loop and a set of multi-input, multi-output control loops.

* * * * *